United States Patent
Xi et al.

(10) Patent No.: US 11,448,581 B2
(45) Date of Patent: Sep. 20, 2022

(54) HIGH SENSITIVITY FIBER OPTIC BASED DETECTION SYSTEM

(71) Applicants: Carrier Corporation, Palm Beach Gardens, FL (US); Jie Xi, Shanghai (CN)

(72) Inventors: Jie Xi, Shanghai (CN); Michael J. Birnkrant, Wethersfield, CT (US); Alan Matthew Finn, Hebron, CT (US); Jennifer M. Alexander, Glastonbury, CT (US); David L. Lincoln, Cromwell, CT (US); Jun Hou, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/057,991

(22) PCT Filed: Jul. 13, 2018

(86) PCT No.: PCT/CN2018/095540
§ 371 (c)(1),
(2) Date: Nov. 23, 2020

(87) PCT Pub. No.: WO2020/010596
PCT Pub. Date: Jan. 16, 2020

(65) Prior Publication Data
US 2021/0199553 A1   Jul. 1, 2021

(51) Int. Cl.
*G01N 15/06* (2006.01)
*G08B 17/107* (2006.01)

(52) U.S. Cl.
CPC ........... *G01N 15/06* (2013.01); *G08B 17/107* (2013.01); *G01N 2015/0693* (2013.01)

(58) Field of Classification Search
CPC ....................... G01N 15/06; G01N 2015/0693
(Continued)

(56) References Cited

U.S. PATENT DOCUMENTS

| 4,556,873 A | 12/1985 | Yamada et al. |
| 5,162,778 A * | 11/1992 | Williamson ....... G08B 13/1436 340/429 |

(Continued)

FOREIGN PATENT DOCUMENTS

| CN | 101315725 B | 6/2011 |
| CN | 102917474 A | 2/2013 |

(Continued)

OTHER PUBLICATIONS

International Search Report of the International Searching Authority; International Application No. PCT/CN2018/095540; International Filing Date: Jul. 13, 2018; dated Mar. 1, 2019; 4 pages.

(Continued)

*Primary Examiner* — Tarifur R Chowdhury
*Assistant Examiner* — Omar H Nixon
(74) *Attorney, Agent, or Firm* — Cantor Colburn LLP

(57) ABSTRACT

According to another embodiment, a method of detecting the occurrence of a condition using a detection system located within a predetermined area includes transmitting light from at least one node of a plurality of nodes into an ambient atmosphere adjacent the at least one node, receiving scattered light from the ambient atmosphere at the at least one node, communicating the received scattered light to a control system operably coupled to the at least one node, analyzing the scattered light at the control system to determine a condition of the ambient atmosphere adjacent each at least one node, and adjusting a sensitivity of the at least one node of the plurality of nodes.

16 Claims, 20 Drawing Sheets

(58) Field of Classification Search
USPC .......................................................... 356/338
See application file for complete search history.

(56) References Cited

U.S. PATENT DOCUMENTS

| | | | | |
|---|---|---|---|---|
| 5,352,901 | A * | 10/1994 | Poorman | G01N 21/532 |
| | | | | 250/574 |
| 8,902,933 | B2 | 12/2014 | Mushkin et al. | |
| 9,377,481 | B1 * | 6/2016 | Greenberg | G01P 5/001 |
| 9,513,364 | B2 | 12/2016 | Hall et al. | |
| 9,792,129 | B2 | 10/2017 | Alicot et al. | |
| 2002/0025232 | A1 * | 2/2002 | Miller | B23P 13/02 |
| | | | | 407/13 |
| 2003/0209670 | A1 | 11/2003 | Chang et al. | |
| 2006/0276697 | A1 * | 12/2006 | Demuth | A61B 5/418 |
| | | | | 600/322 |
| 2007/0185736 | A1 * | 8/2007 | Cervi | G16H 20/10 |
| | | | | 705/2 |
| 2008/0218364 | A1 * | 9/2008 | Mizuo | G08B 17/107 |
| | | | | 340/630 |
| 2009/0040042 | A1 | 2/2009 | Lontka | |
| 2009/0051551 | A1 * | 2/2009 | Pham | G08B 25/08 |
| | | | | 340/577 |
| 2011/0241877 | A1 | 10/2011 | Wedig et al. | |
| 2013/0321161 | A1 * | 12/2013 | Chen | G08B 25/14 |
| | | | | 340/628 |
| 2015/0112885 | A1 | 4/2015 | Fadell et al. | |
| 2018/0005125 | A1 | 1/2018 | Fadell et al. | |
| 2018/0136054 | A1 | 5/2018 | Birnkrant et al. | |
| 2021/0209918 | A1 | 7/2021 | Birnkrant et al. | |
| 2021/0318180 | A1 | 10/2021 | Huang et al. | |

FOREIGN PATENT DOCUMENTS

| | | |
|---|---|---|
| CN | 103049976 A | 4/2013 |
| CN | 103228078 A | 7/2013 |
| CN | 103945017 A | 7/2014 |
| CN | 104345020 A | 2/2015 |
| CN | 103954930 B | 3/2017 |
| CN | 206039816 U | 3/2017 |
| CN | 106981148 A | 7/2017 |
| CN | 108072505 A | 5/2018 |
| CN | 108072596 A | 5/2018 |
| EP | 2581889 A1 | 4/2013 |
| JP | 2006304056 A | 11/2006 |
| KR | 200425903 Y1 | 9/2006 |
| KR | 101796385 B1 | 11/2017 |

OTHER PUBLICATIONS

International Search Report of the International Searching Authority; International Application No. PCT/US2019/041375; International Filing Date: Jul. 11, 2019; dated Jan. 15, 2020; 5 pages.

Written Opinion of the International Searching Authority; International Application No. PCT/CN2018/095540; International Filing Date: Jul. 13, 2018; dated Mar. 1, 2019; 5 pages.

Written Opinion of the International Searching Authority; International Application No. PCT/US2019/041375; International Filing Date; Jul. 11, 2019; dated Jan. 15, 2020; 11 pages.

European Partial Search Report; European Application No. 18926039.1; dated Feb. 7, 2022; 16 pages.

U.S. Non-Final Office Action; U.S. Appl. No. 17/057,992, filed Nov. 23, 2020; dated Dec. 3, 2021; 8 pages.

European Extended Search Report; European Application No. 18926039.1; dated Jun. 8, 2022; 16 pages.

* cited by examiner

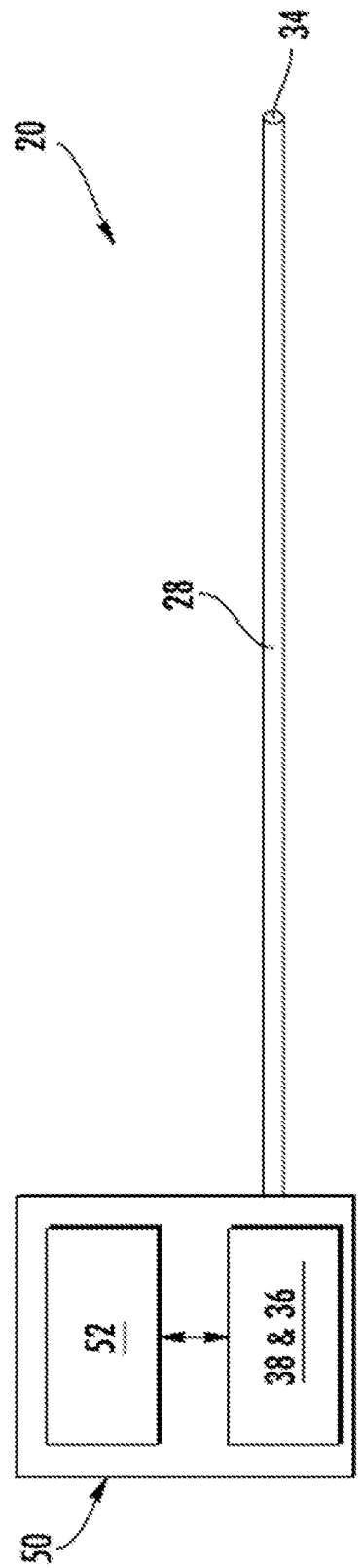

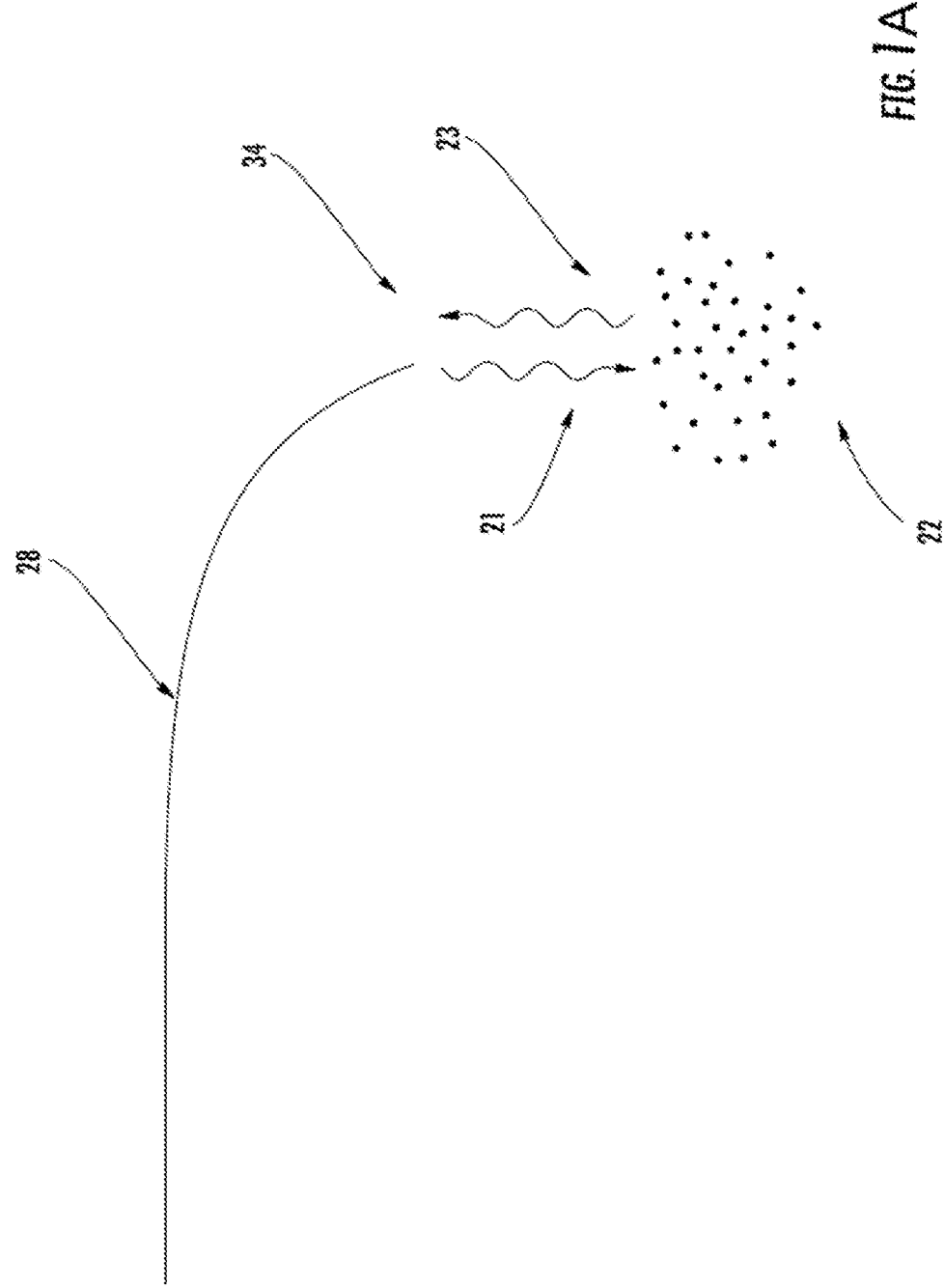

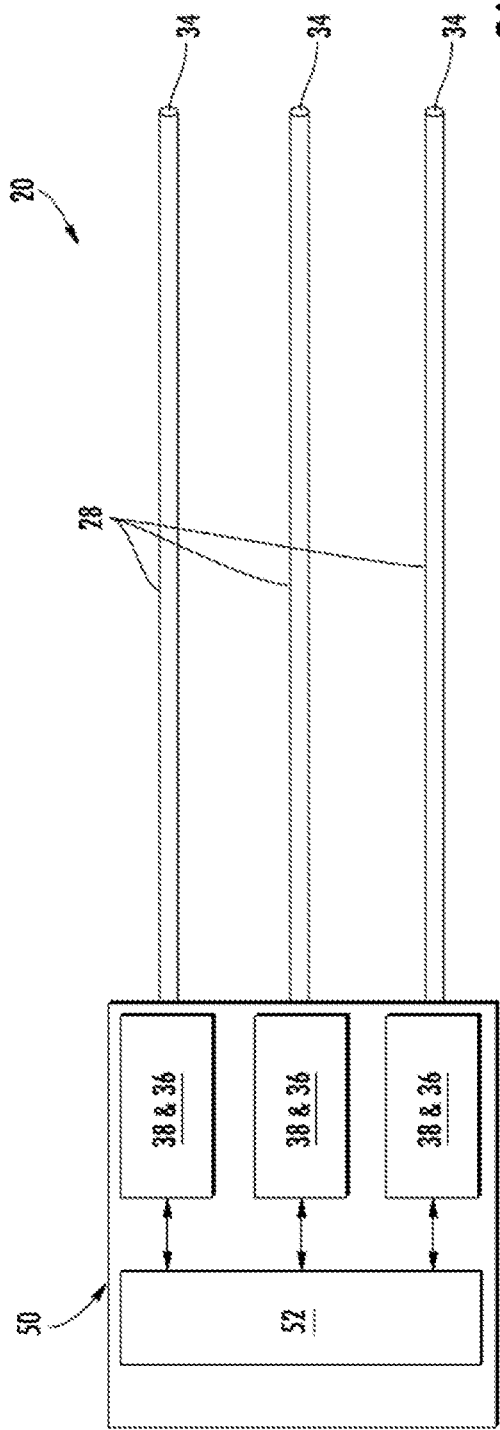

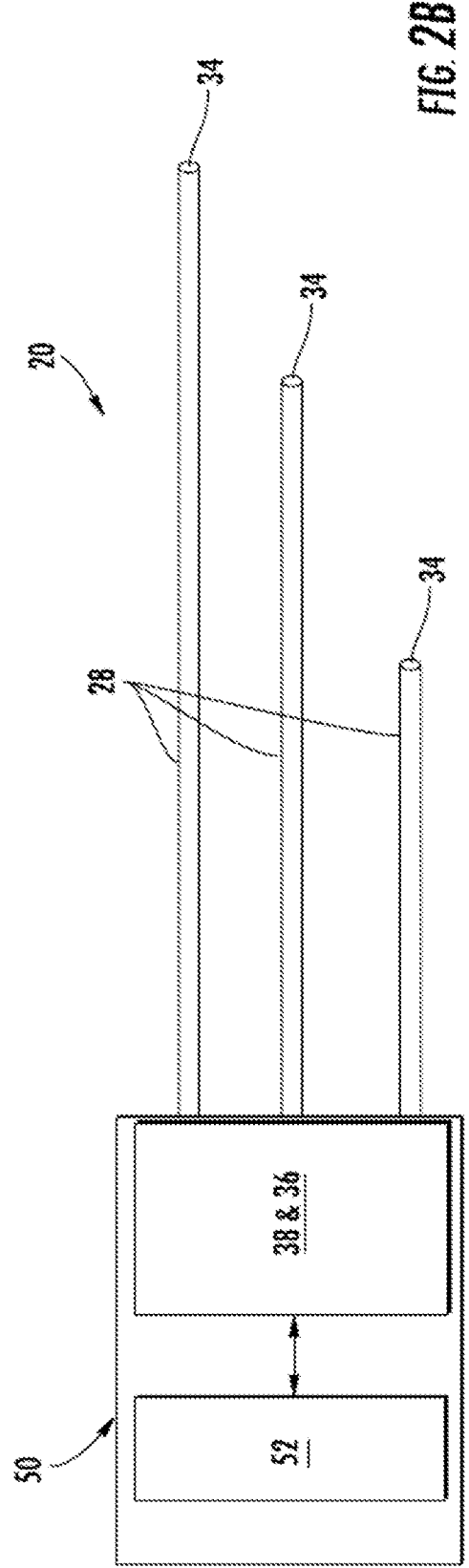

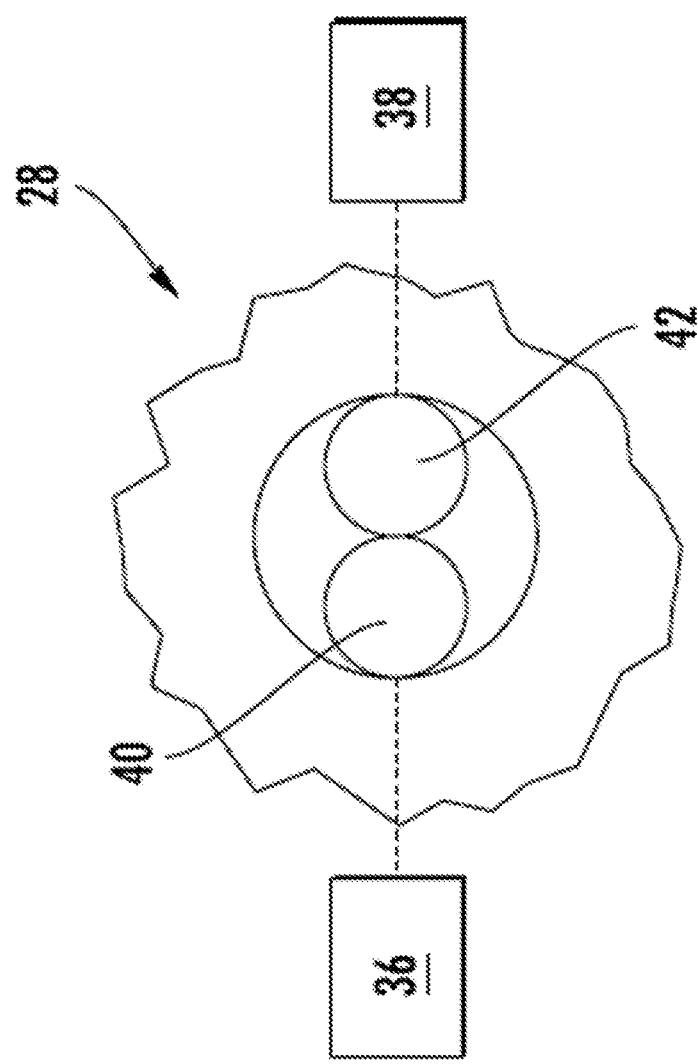

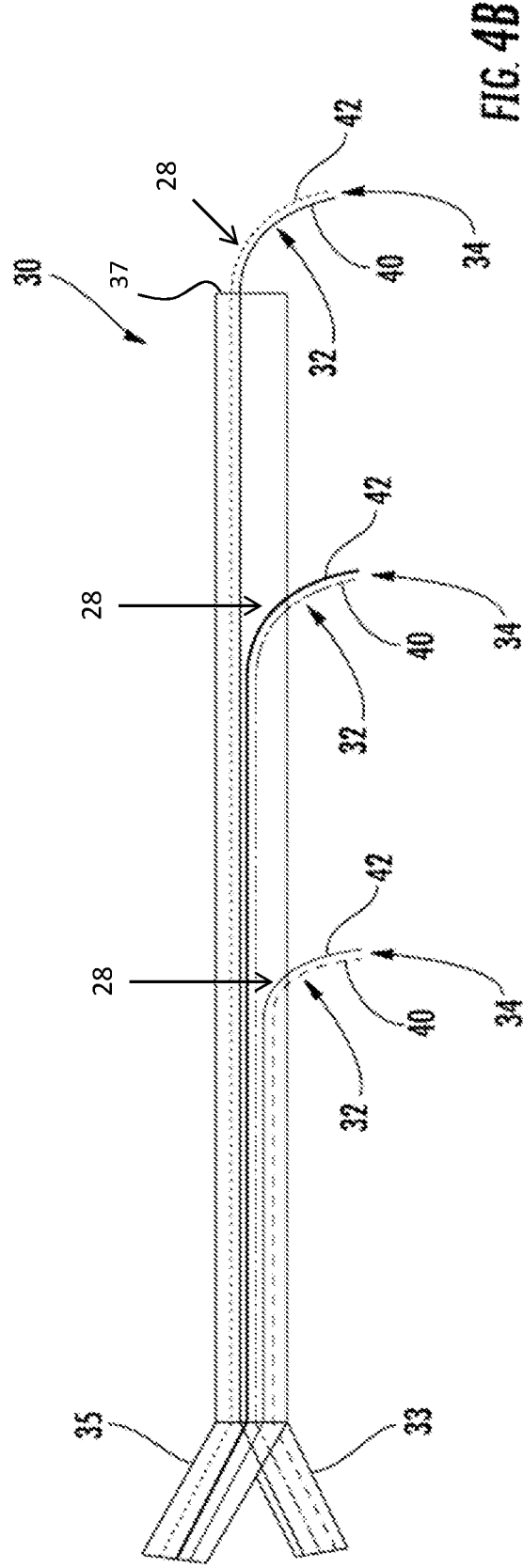

HIGH SENSITIVITY FIBER OPTIC BASED DETECTION SYSTEM

CROSS REFERENCE TO RELATED APPLICATIONS

This application is a National Stage application of PCT/CN2018/095540 filed Jul. 13, 2018, which is incorporated by reference in its entirety herein.

BACKGROUND

Embodiments of this disclosure relate generally to a fiber optic system for detecting conditions within a predetermined space and, more particularly, to a system and method for performing localized mapping of detector locations relative to a facility and for controlling the system.

Conventional smoke detection systems operate by detecting the presence of smoke or other airborne pollutants. Upon detection of a threshold level of particles, an alarm or other signal, such as a notification signal, may be activated and operation of a fire suppression system may be initiated.

High sensitivity smoke detection systems may incorporate a pipe network consisting of one or more pipes with holes or inlets installed at positions where smoke or pre-fire emissions may be collected from a region or environment being monitored. Air is drawn into the pipe network through the inlets, such as via a fan, and is subsequently directed to a detector. In some conventional smoke detection systems, individual sensor units may be positioned at each sensing location, and each sensor unit has its own processing and sensing components.

Smoke detectors typically provide a status to a person within the area being monitored via one or more indicators, such as lights or noise generators for example. These indicators are operable to indicate not only the presence of an event, but also whether the detector is functioning properly. However, it may be desirable to provide additional feedback to a user or a control system monitoring the detectors. For example, it may be desirable to know the physical location of each detector of a system to ease maintenance and reduce the time required to mitigate the detected condition.

Typically, mapping the physical location of detectors or nodes of a detection system within a building or facility requires manually measuring positions and drawing locations on a physical map. Such processes are tedious, error-prone, and must be redone with any changes in layout. Further, the resulting physical map is not machine readable, i.e. is not automatically displayed on the fire alarm panel.

SUMMARY

According to an embodiment, a system for locating a detection system within a predetermined area includes a fiber optic harness defining at least one node in communication with the predetermined area. Light is received at the at least one node. At least one emitter is arranged in communication with the at least one node. A control system is operably coupled to the at least one emitter and the at least one node to determine a physical location of the at least one node relative to the predetermined area.

In addition to one or more of the features described above, or as an alternative, in further embodiments the interactive display is operable to display a map of the predetermined area.

In addition to one or more of the features described above, or as an alternative, in further embodiments the interactive display is further operable to display a physical location of the node of the control system within the predetermined area.

In addition to one or more of the features described above, or as an alternative, in further embodiments the at least one input is selected from a sensor and a video camera arranged within the predetermined area.

In addition to one or more of the features described above, or as an alternative, in further embodiments the at least one input is received by a user interface.

In addition to one or more of the features described above, or as an alternative, in further embodiments the at least one input comprises contact information for addressing communications from the interface.

In addition to one or more of the features described above, or as an alternative, in further embodiments the at least one input comprises a command to adjust one or more parameters associated with the control system.

In addition to one or more of the features described above, or as an alternative, in further embodiments the at least one input comprises authorization credentials.

In addition to one or more of the features described above, or as an alternative, in further embodiments the interactive display is operable to display information associated with a detected event.

In addition to one or more of the features described above, or as an alternative, in further embodiments the interactive display is operable to display information about the status of a node comprising one or more of a blocked node or non-functioning node.

In addition to one or more of the features described above, or as an alternative, in further embodiments the interactive display is operable to show one or more algorithm parameters associated with the control system.

In addition to one or more of the features described above, or as an alternative, in further embodiments the interactive display is operable to set off all or part of a fire suppression system.

According to another embodiment, a method of determining a physical location of at least one node of a detection system relative to a predetermined area includes providing a signal from at least one emitter to the at least one node, receiving the signal from the at least one emitter at the at least one node, and determining the physical location of the at least one node in response to the signal received at the at least one node.

In addition to one or more of the features described above, or as an alternative, in further embodiments providing a signal from at least one emitter to the at least one node further comprises providing a first signal from a first emitter of the at least one emitter to the at least one node, receiving the first signal from first emitter at the at least one node, providing a second signal from a second emitter of the at least one emitter to the at least one node, and receiving the second signal from second emitter at the at least one node.

In addition to one or more of the features described above, or as an alternative, in further embodiments comprising determining a first time of flight between providing the first signal from the first emitter and receiving the first signal at the at least one node and determining a second time of flight between providing the second signal from the second emitter and receiving the second signal at the at least one node.

In addition to one or more of the features described above, or as an alternative, in further embodiments comprising providing a third signal from a third emitter of the at least one emitter to the at least one node and receiving the third signal from third emitter at the at least one node.

In addition to one or more of the features described above, or as an alternative, in further embodiments comprising determining a third time of flight between providing the third signal from the third emitter and receiving the third signal at the at least one node.

In addition to one or more of the features described above, or as an alternative, in further embodiments comprising applying triangulation to the first time of flight, the second time of flight, and the third time of flight to determine the physical location of the at least one node.

In addition to one or more of the features described above, or as an alternative, in further embodiments comprising moving the at least one emitter to a position directly adjacent the at least one node.

In addition to one or more of the features described above, or as an alternative, in further embodiments the at least one emitter is positioned directly adjacent the at least one node when the signal is provided from the at least one emitter to the at least one node.

In addition to one or more of the features described above, or as an alternative, in further embodiments comprising moving the at least one emitter from a first position to a second, known position within the predetermined area such that a first signal is received from the emitter at the at least one node when the emitter is at the first position and a second signal is received from the emitter at the at least one node when the emitter is at the second position.

In addition to one or more of the features described above, or as an alternative, in further embodiments moving the at least one emitter to a second position comprises rotating the at least one emitter to a desired angle relative to the at least one node.

In addition to one or more of the features described above, or as an alternative, in further embodiments determining the physical location of the at least one node occurs in response to the signal received at the at least one node.

According to yet another embodiment, a detection system includes a fiber optic harness comprising a plurality of nodes distributed throughout a predetermined area. Light is transmitted from each of the plurality of nodes and scattered light is received at each of the plurality of nodes. A control system is operably coupled to the fiber optic harness for receiving the scattered light from each of the plurality of nodes. The control system is operable to analyze the scattered light to determine a condition at each of the plurality of nodes and control a sensitivity of each of the plurality of nodes.

In addition to one or more of the features described above, or as an alternative, in further embodiments the predetermined area further comprises a plurality of risk regions, and within the control system each of the plurality of nodes is associated with one of the plurality of risk regions.

In addition to one or more of the features described above, or as an alternative, in further embodiments the control system determines the plurality of risk regions in response to at least one of a risk of occurrence of a condition, traffic flow within the region, assets located within the region, environmental nuisances, and access to an environment within the region.

In addition to one or more of the features described above, or as an alternative, in further embodiments the sensitivity of each node is controlled in response to the risk region associated with the node.

In addition to one or more of the features described above, or as an alternative, in further embodiments the control system controls the sensitivity of each of the plurality of nodes by adjusting one or more parameters associated with an algorithm run by the control system.

In addition to one or more of the features described above, or as an alternative, in further embodiments the one or more parameters comprises one or more of a time of day, a day of week, a day of month, and a day of year.

In addition to one or more of the features described above, or as an alternative, in further embodiments the one or more parameters comprises a condition detected at another node of the plurality of nodes.

In addition to one or more of the features described above, or as an alternative, in further embodiments the control system detects an operational status of at least one of the plurality of nodes and in response controls the sensitivity of at least one of the plurality of nodes.

In addition to one or more of the features described above, or as an alternative, in further embodiments the control system controls the sensitivity of each of the plurality of nodes in response to the detected operational status.

According to another embodiment, a method of detecting the occurrence of a condition using a detection system located within a predetermined area includes transmitting light from at least one node of a plurality of nodes into an ambient atmosphere adjacent the at least one node, receiving scattered light from the ambient atmosphere at the at least one node, communicating the received scattered light to a control system operably coupled to the at least one node, analyzing the scattered light at the control system to determine a condition of the ambient atmosphere adjacent each at least one node, and adjusting a sensitivity of the at least one node of the plurality of nodes.

In addition to one or more of the features described above, or as an alternative, in further embodiments adjusting a sensitivity of the at least one node further comprises determining a risk associated with a location of the at least one node.

In addition to one or more of the features described above, or as an alternative, in further embodiments the risk associated with a location of the at least one node is determined based upon at least one of a risk of occurrence of a condition, traffic flow within the region, assets located within the region, environmental nuisances, and access to an environment within the region.

In addition to one or more of the features described above, or as an alternative, in further embodiments adjusting a sensitivity of the at least one node comprises altering one or more parameters associated with analyzing the scattered light.

In addition to one or more of the features described above, or as an alternative, in further embodiments the one or more parameters comprises one or more of a time of day, a day of week, a day of month, and a day or year.

In addition to one or more of the features described above, or as an alternative, in further embodiments the one or more parameters comprises a condition detected at another node of the plurality of nodes.

In addition to one or more of the features described above, or as an alternative, in further embodiments adjusting a sensitivity of the at least one node further comprises determining an operational status of the at least one node using the control system.

In addition to one or more of the features described above, or as an alternative, in further embodiments determining an operational status of the at least one node comprises analyzing background data collected by the control system.

In addition to one or more of the features described above, or as an alternative, in further embodiments adjusting a sensitivity of the at least one node occurs in response to determining the operational status of each of the plurality of nodes.

According to yet another embodiment, a detection system includes a fiber optic cable for transmitting light, the at least one fiber optic cable defining a node and a control system operably coupled to the fiber optic cable such that scattered light associated with the node is transmitted to the control system. The control system is operable to determine at least one of a presence and magnitude of one or more conditions at the node. An interactive display is arranged in communication with the control system and is operable to receive at least one input. The interactive display is operable to display a status of a predetermined area in response to information provided by at least one of the control system and the at least one input.

In addition to one or more of the features described above, or as an alternative, in further embodiments the interactive display is operable to display a map of the predetermined area.

In addition to one or more of the features described above, or as an alternative, in further embodiments the interactive display is further operable to display a physical location of the node of the control system within the predetermined area.

In addition to one or more of the features described above, or as an alternative, in further embodiments the at least one input is selected from a sensor and a video camera arranged within the predetermined area.

In addition to one or more of the features described above, or as an alternative, in further embodiments the at least one input is received by a user interface.

In addition to one or more of the features described above, or as an alternative, in further embodiments the at least one input comprises contact information for addressing communications from the interface.

In addition to one or more of the features described above, or as an alternative, in further embodiments the at least one input comprises a command to adjust one or more parameters associated with the control system.

In addition to one or more of the features described above, or as an alternative, in further embodiments the at least one input comprises authorization credentials.

In addition to one or more of the features described above, or as an alternative, in further embodiments the interactive display is operable to display information associated with a detected event.

In addition to one or more of the features described above, or as an alternative, in further embodiments the interactive display is operable to display information about the status of a node comprising one or more of a blocked node or non-functioning node.

In addition to one or more of the features described above, or as an alternative, in further embodiments the interactive display is operable to show one or more algorithm parameters associated with the control system.

In addition to one or more of the features described above, or as an alternative, in further embodiments the interactive display is operable to set off all or part of a fire suppression system.

According to another embodiment, a method of detecting the occurrence of a condition using a detection system located within a predetermined area includes transmitting light from at least one node of a plurality of nodes into an ambient atmosphere adjacent the at least one node, receiving scattered light from the ambient atmosphere at the at least one node, communicating the scattered light to a control system operably coupled to the at least one node, analyzing the scattered light using an algorithm to evaluate a condition of the ambient atmosphere adjacent the at least one node, and displaying on a display a status of the predetermined area in response to information provided by at least one of the control system and an input.

In addition to one or more of the features described above, or as an alternative, in further embodiments displaying a status of the predetermined area comprises displaying a map of the predetermined area, a location of the at least one node, and a location where the condition was detected.

In addition to one or more of the features described above, or as an alternative, in further embodiments displaying the location where the condition was detected comprises identifying a node where the condition was detected.

In addition to one or more of the features described above, or as an alternative, in further embodiments the at least one input is received by a user interface.

In addition to one or more of the features described above, or as an alternative, in further embodiments the at least one input comprises a command to adjust one or more parameters associated with the control system.

In addition to one or more of the features described above, or as an alternative, in further embodiments the at least one input comprises authorization credentials.

In addition to one or more of the features described above, or as an alternative, in further embodiments displaying a status of the predetermined area further comprises displaying information about a status of a node comprising a blocked node or non-functioning node.

In addition to one or more of the features described above, or as an alternative, in further embodiments comprising displaying on the display one or more algorithm parameters associated with the control system.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is schematic diagram of a detection system according to an embodiment;

FIG. 1A is a schematic diagram of light transmission at a node of a detection system according to an embodiment;

FIG. 2A is a schematic diagram of a detection system according to another embodiment;

FIG. 2B is a schematic diagram of a detection system according to another embodiment;

FIG. 3 is a cross-sectional view of a fiber optic node of the fiber harness of FIG. 1 according to an embodiment;

FIG. 4B is a schematic diagram of a fiber harness of a detection system according to an embodiment;

Figure 4A:
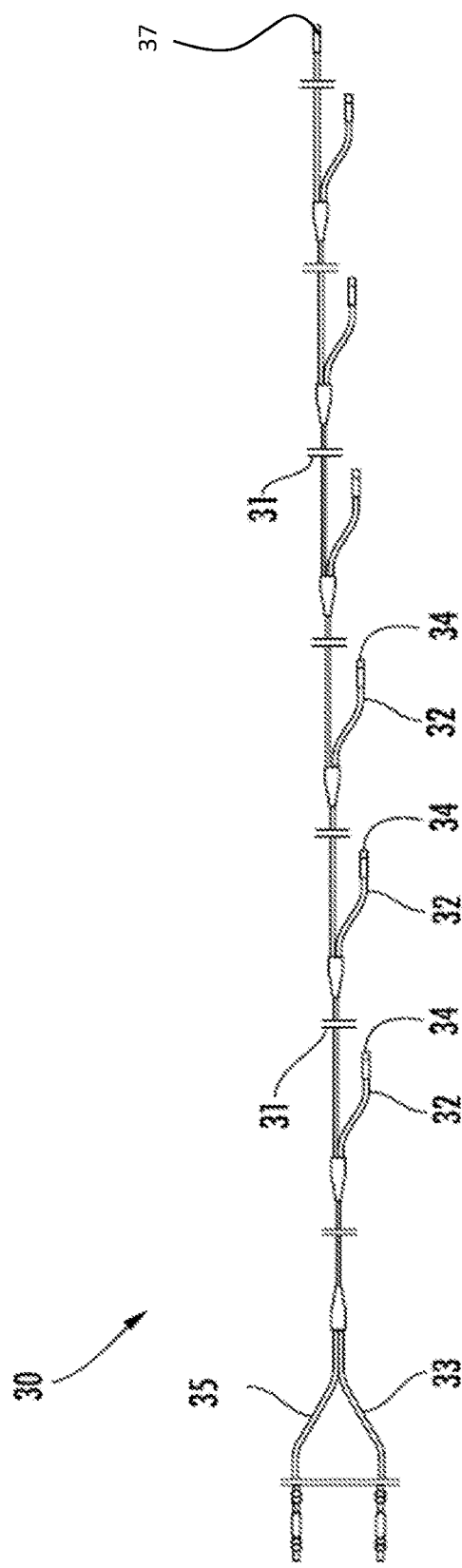
FIG. 4A is a side view of a fiber harness of a detection system according to an embodiment.

The detailed description explains embodiments of the present disclosure, together with advantages and features, by way of example with reference to the drawings.

DETAILED DESCRIPTION

Referring now to the FIGS., a system 20 for detecting one or more conditions or events within a designated area is illustrated. The detection system 20 may be able to detect one or more hazardous conditions, including but not limited to the presence of smoke, fire, temperature, flame, or any of a plurality of pollutants, combustion products, or chemicals. Alternatively, or in addition, the detection system 20 may be configured to perform monitoring operations of people, lighting conditions, or objects. In an embodiment, the system 20 may operate in a manner similar to a motion sensor, such as to detect the presence of a person, occupants, or unauthorized access to the designated area for example. The conditions and events described herein are intended as an example only, and other suitable conditions or events are within the scope of the disclosure. By improving the human-machine interface of the detection system 20, such as by mapping the physical location of each of node or detector within the system for example, the operation of each detector may be tracked and adjusted to maximize the operational efficiency of the system 20.

The detection system 20 uses light to evaluate a volume for the presence of a condition. In this specification, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a predetermined condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining the presence of a predetermined condition or event.

Further, in this specification, the term "particles" may include physical objects of any size such as atoms, molecules, structured or unstructured agglomerations of atoms or molecules, and the like. In an example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the received light, by detecting light scattered by an object for example, can provide information about the designated area including determining the presence of a predetermined condition or event.

In its most basic form, as shown in FIG. 1, the detection system 20 includes a single fiber optic cable 28 with at least one fiber optic core. The term fiber optic cable 28 includes any form of optical fiber. As examples, an optical fiber is a length of cable that is composed of one or more optical fiber cores of single-mode, multimode, polarization maintaining, photonic crystal fiber or hollow core. Each cable may have a length of up to 5000 m. A node 34 is located at the termination point of a fiber optic cable 28 and is inherently included in the definition of a fiber optic cable 28. The node 34 is positioned in communication with the ambient atmosphere. A light source 36, such as a laser diode for example, and a light sensitive device 38, such as a photodiode for example, are coupled to the fiber optic cable 28. A control system 50 of the detection system 20 including a control unit 52, discussed in further detail below, is utilized to manage the detection system operation and may include control of components, data acquisition, data processing and data analysis.

As shown in FIG. 1A, the light from the light source 36 is transmitted through fiber optic cable 28 and through the node 34 to the surrounding area, illustrated schematically at 21. The light 21 interacts with one or more particles indicative of a condition, illustrated schematically at 22, and is reflected or transmitted back to the node 34, illustrated schematically at 23. A comparison of the light provided to the node 34 from the light source 36 and/or changes to the light reflected back to the light sensitive device 38 from the node 34 will indicate whether or not changes in the atmosphere, such as particles 22 for example, are present in the ambient atmosphere adjacent the node 34 that are causing the scattering of the light. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure.

In another embodiment, the detection system 20 can include a plurality of nodes 34. For example, as illustrated in FIG. 2A, a plurality of fiber optic cables 28 and corresponding nodes 34 are each associated with a distinct light sensitive device 38. In embodiments where an individual light sensitive device 38 is associated with each node 34, as shown in FIG. 2A, the signal output from each node 34 can be monitored. Upon detection of a predetermined event or condition, it will be possible to localize the position of the event because the position of each node 34 within the system 20 is known. Alternately, as shown in FIG. 2B, a plurality of fiber optic cables 28, may be coupled to a single light source 36 and/or light sensitive device 38.

In embodiments where a single light sensitive device 38 is configured to receive scattered light from a plurality of nodes 34, the control system 50 is able to localize the scattered light, i.e. identify the scattered light received from each of the plurality of nodes 34. For example, the control system 50 may use the position of each node 34, specifically the length of the fiber optic cables 28 associated with each node 34 and the corresponding time of flight (i.e. the time elapsed between when the light was emitted by the light source 36 and when the scattered light was received by the light sensitive device 38), to associate different portions of the light signal with each of the respective nodes 34 that are connected to that light sensitive device 38. Alternatively, or in addition, the time of flight may include the time elapsed between when the light is emitted from the node 34 and when the scattered light is received back at the node 34. In such embodiments, the time of flight provides information regarding the distance of the object or particle relative to the node 34.

In an embodiment, illustrated in the cross-section of the fiber optic cable shown in FIG. 3, two substantially identical and parallel light transmission fiber cores 40, 42 are included in the fiber optic cable 28 and terminate at the node 34 (not shown in FIG. 3). However, it should be understood that embodiments are also contemplated herein where the fiber optic cable 28 includes only a single fiber core, or more than two cores. In an embodiment, the light source 36 is coupled to the first fiber core 40 and the light sensitive device 38 is coupled to the second fiber core 42, for example near a first end of the fiber optic cable 28. The light source 36 is selectively operable to emit light, which travels down the first fiber core 40 of the fiber optic cable 28 to the node 34. At the node 34, the emitted light is expelled into the adjacent atmosphere. The light is scattered and transmitted back into the node 34 and down the fiber cable 28 to the light sensitive device 38 via the second fiber core 42.

In more complex embodiments, as shown in FIGS. 4A and 4B, rather than having a plurality of individual fiber optic cables 28 separately coupled to the control unit 50, the detection system 20 includes a fiber harness 30. The fiber harness 30 may be formed by bundling a plurality of fiber optic cables 28, or the cores associated with a plurality of fiber optic cables 28, together within a single conduit or sheath for example. However, it should be understood that embodiments where the fiber harness 30 includes only a single fiber optic cable 28 or the cores associated therewith are also contemplated herein.

Structural rigidity is provided to the fiber harness 30 via the inclusion of one or more fiber harness backbones 31. As shown in the FIG., in embodiments where the fiber harness 30 includes a plurality of fiber optic cables 28, the plurality of cables 28 may be bundled together at one or more locations, upstream from the end of each cable 28. The end of each fiber optic cable 28, and therefore the end of each core associated with the cable 28, is separated from the remainder of the fiber optic cables 28 at an adjacent, downstream backbone 31 formed along the length of the fiber harness 30. Each of these free ends defines a fiber optic branch 32 of the fiber harness 30 and has a node 34 associated therewith. For example, as best shown in FIG. 4B, each fiber optic branch 32 includes the free ends of cores 40, 42 that define a node 34 of a corresponding fiber optic cable 28.

In the illustrated, non-limiting embodiments of FIGS. 4A and 4B, the fiber harness 30 additionally includes an emitter leg 33 and a receiver leg 35 associated with each of the plurality of fiber optic branches 32. The emitter leg 33 may contain the first fiber optic cores 40 from each of the plurality of fiber optic branches 32 and the receiver leg 35 may contain all of the second fiber cores 42 from each of the fiber optic branches 32. The length of each pair of fiber optic cores 40, 42 extending between the emitter leg 33 or the receiver leg 35 and a node 34 may vary in length. As a result, each node 34, defined by the cores 40, 42 at the end of each fiber optic branch 32, may be arranged at a distinct location along the fiber harness 30. Accordingly, the position of each of the nodes 34 relative to the fiber harness 30 may be controlled by the length of the cores 40, 42 associated with each node 34. The position of each of the nodes 34 may be set during manufacture, or at the time of installation of the system 20. With this variation in length and therefore position of each node 34, only the longest core or pair of cores 40, 42 is supported at the final backbone 31 located upstream from the end 37 of the harness 30.

Alternatively, the fiber harness 30 may include a fiber optic cable (not shown) having a plurality of branches 32 integrally formed therewith and extending therefrom. The branches 32 may include only a single fiber optic core. The configuration, specifically the spacing of the nodes 34 within a fiber harness 30 may be arranged at locations substantially equidistant from one another. Alternatively, the distance between a first node and a second node may be distinct than the distance between the second node and a third node. In an embodiment, the positioning of each node 34 may correlate to a specific location within the designated area. It is understood that there is no minimum spacing required between adjacent nodes 34.

Figure 5:
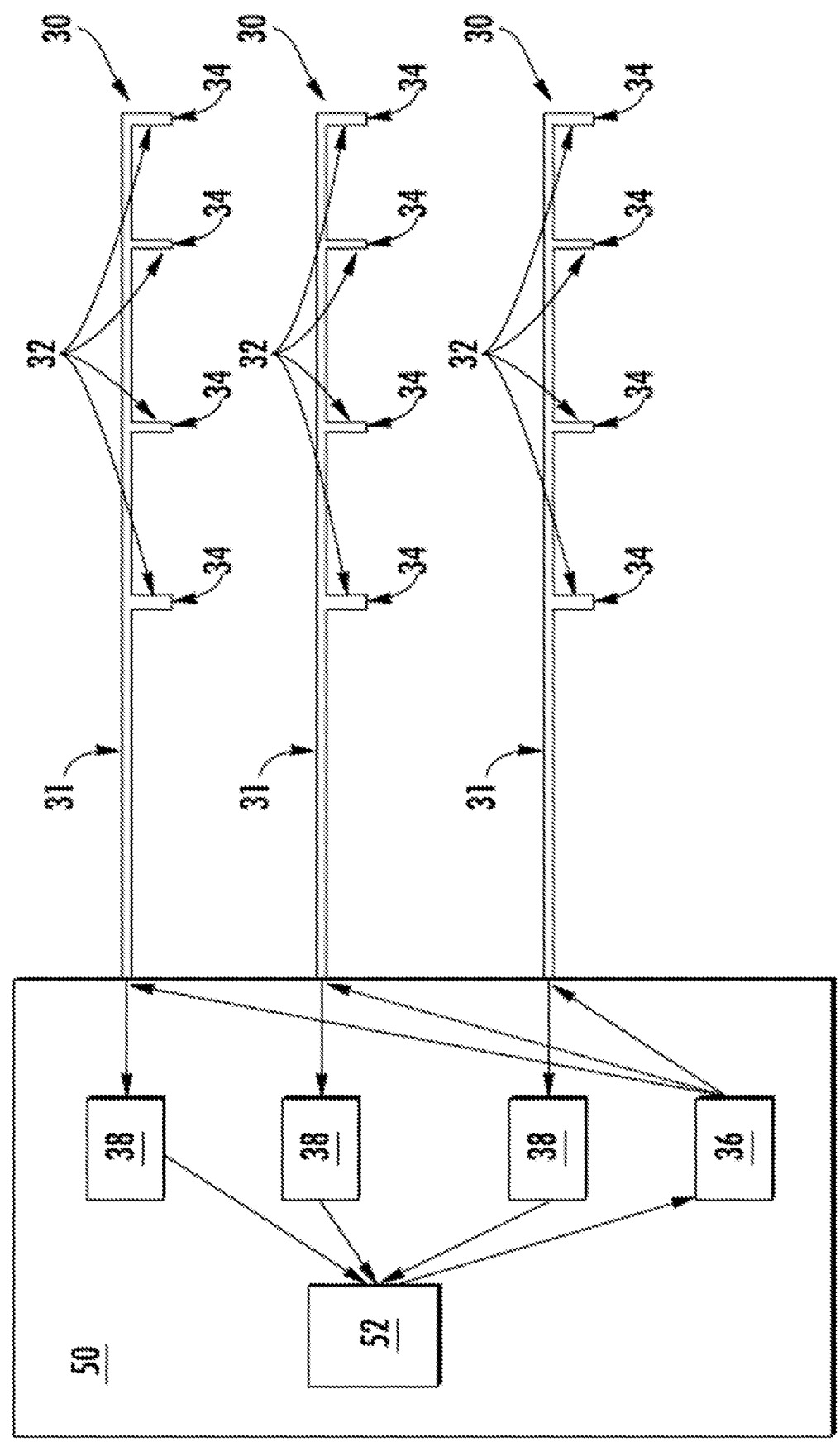
FIG. 5 is a schematic diagram of a detection system including a plurality of fiber harnesses according to an embodiment.

With reference now to FIG. 5, the detection system 20 may additionally include a plurality of fiber harnesses 30. In the illustrated, non-limiting embodiment, a distinct light sensitive device 38 is associated with each of the plurality of fiber harnesses 30, and more specifically with each of the plurality of light transmission cores 42 within the harnesses 30. However, embodiments where a single light sensitive device 38 is coupled to the plurality of fiber harnesses 30 are also contemplated here. In addition, a single light source 36 may be operably coupled to the plurality of light transmission fiber cores 40 within the plurality of fiber harnesses 30 of the system 20. Alternatively, the detection system 20 may include a plurality of light sources 36, each of which is coupled to one or more of the plurality of fiber harnesses 30.

Figure 6:
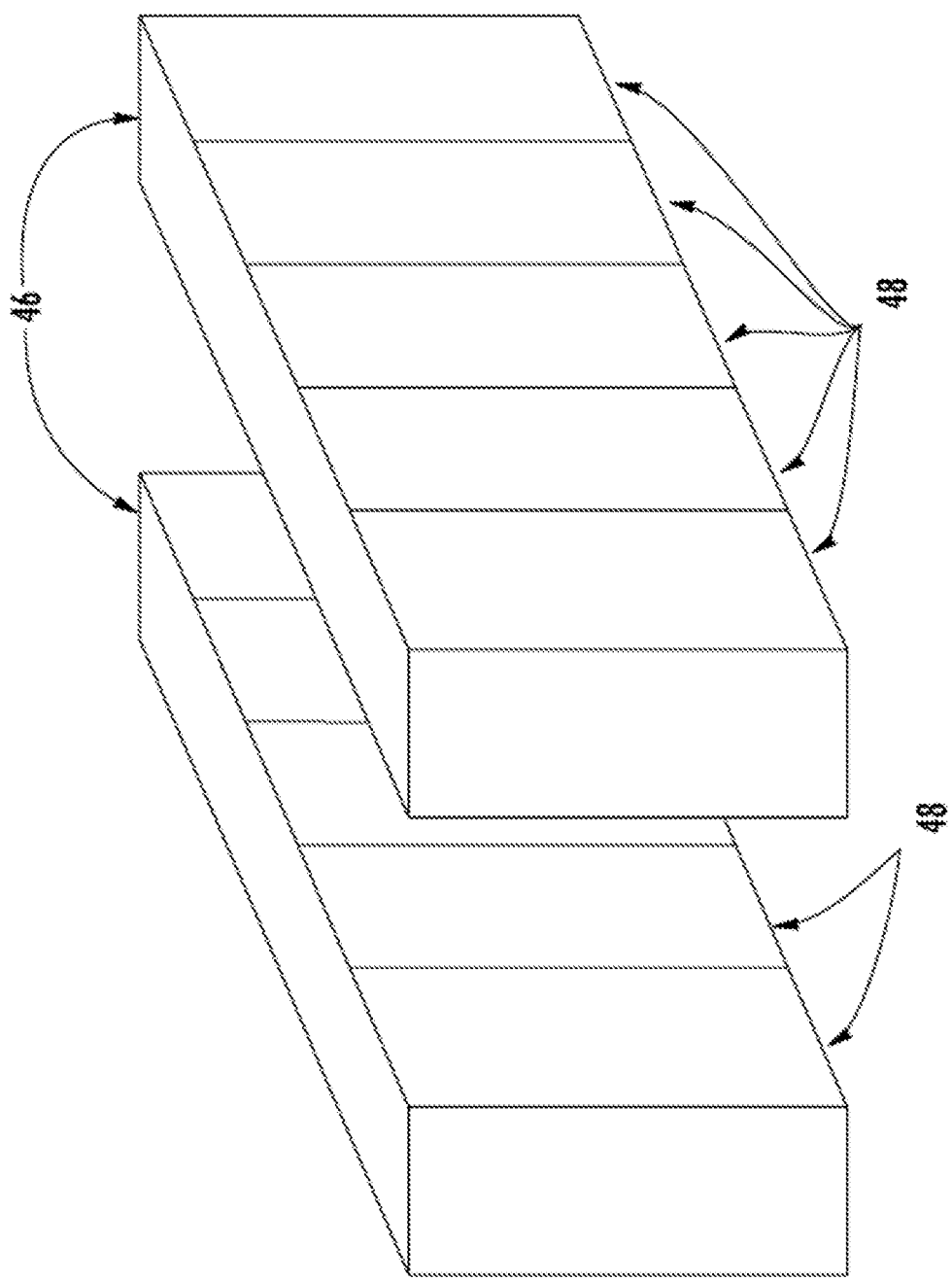
FIG. 6 is a perspective view of an area within a building to be monitored by a detection system according to an embodiment.

The detection system 20 may be configured to monitor a predetermined area, such as a building for example. In an embodiment, the detection system 20 is utilized for predetermined areas having a crowded environment, such as a server room, as shown in FIG. 6. In such embodiments, each fiber harness 30 may be aligned with one or more rows of equipment 46, and each node 34 therein may be located directly adjacent to one of the towers 48 within the rows 46. In addition, the nodes 34 may be arranged so as to monitor specific enclosures, electronic devices, or machinery within the crowded environment. Positioning of the nodes 34 in such a manner allows for earlier detection of a condition as well as localization, which may limit the exposure of the other equipment in the room to the same condition. For example, if a hazardous condition such as overheat, smoke and/or fire were to effect one or more specific pieces of equipment in one or more towers 48, a node 34 physically arranged closest to the tower 48 and/or closest to the equipment may detect the smoke, fire, temperature, and/or flame; Further, since the location of node 34 is known, suppressive or preventative measures may be quickly deployed in the area directly surrounding the node 34, but not in areas where the hazardous condition has not detected. In another application, the detection system 20 may be integrated into an aircraft, such as for monitoring a cargo bay, avionics rack, lavatory, or another confined region of the aircraft that may be susceptible to fires or other events.

Figure 7:
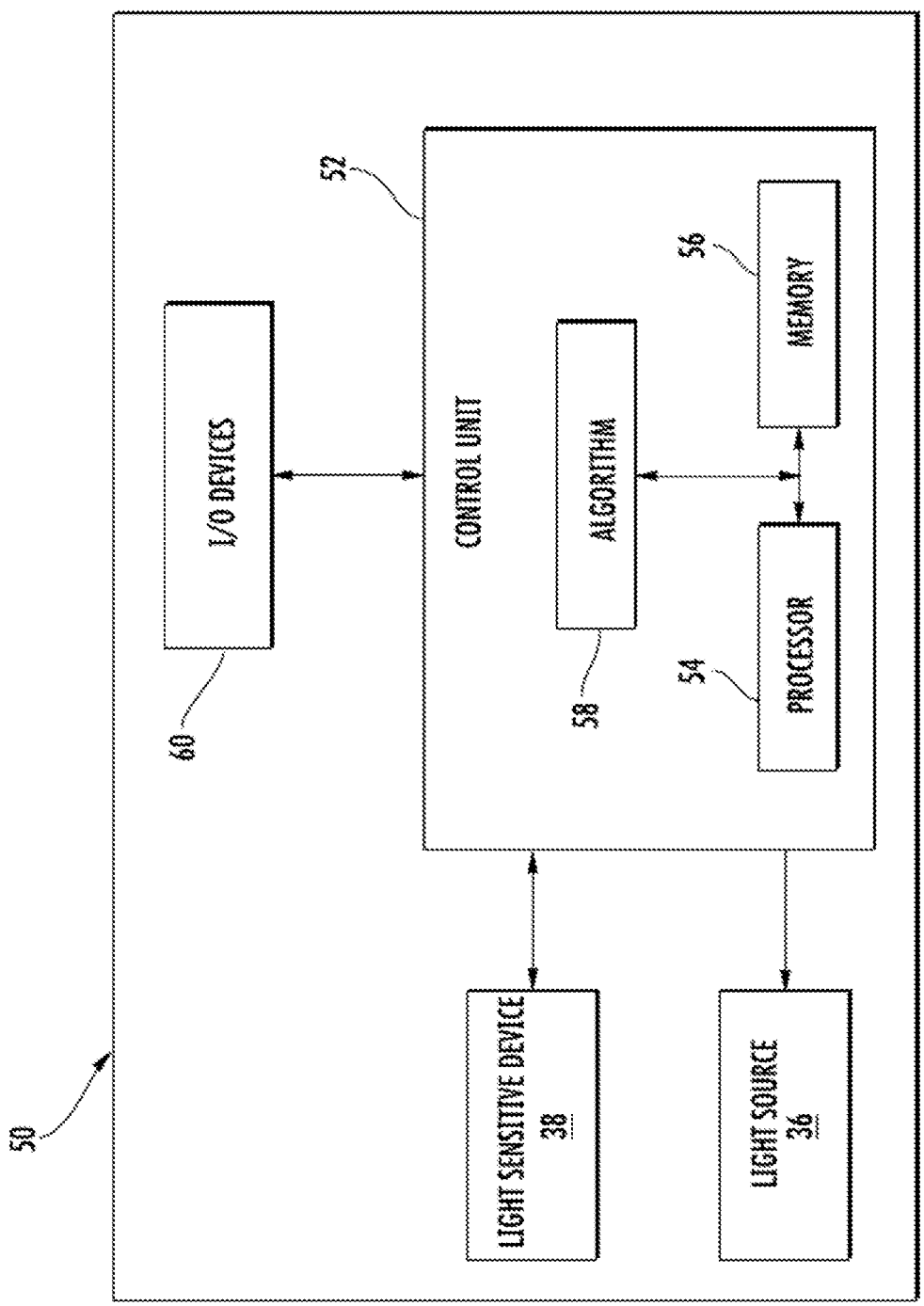
FIG. 7 is a schematic diagram of a control system of the detection system according to an embodiment.

The control system 50 of the detection system 20 is utilized to manage the detection system operation and may include control of components, data acquisition, data processing and data analysis. The control system 50, illustrated in FIG. 7, includes at least one light sensitive device 38, at least one light source, 36, and a control unit 52, such as a computer having one or more processors 54 and memory 56 for implementing one or more algorithms 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM"), or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a fire suppression system which are activated upon detection of a predefined event or condition. It should be understood herein that the term alarm, as used herein, may indicate any of the possible outcomes of a detection.

The control unit 52, and in some embodiments, the processor 54, may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing via the processor 54 using an algorithm 58 to determine whether a predefined condition is present.

The signal received by or outputted from the light sensitive device(s) 38 may be amplified and/or filtered, such as by a comparator (not shown), to reduce or eliminate irrelevant information within the signal prior to being communicated to the control unit 52 located remotely from the node 34. In such embodiments, the amplification and filtering of the signal may occur directly within the light sensing device 38, or alternatively, may occur via one or more components disposed between the light sensing device 38 and the control unit 52. The control unit 52 may control the data acquisition of the light sensitive device 38, such as by adjusting the gain of the amplifier, the bandwidth of filters, sampling rates, the amount of timing and data buffering for example.

Figure 8:
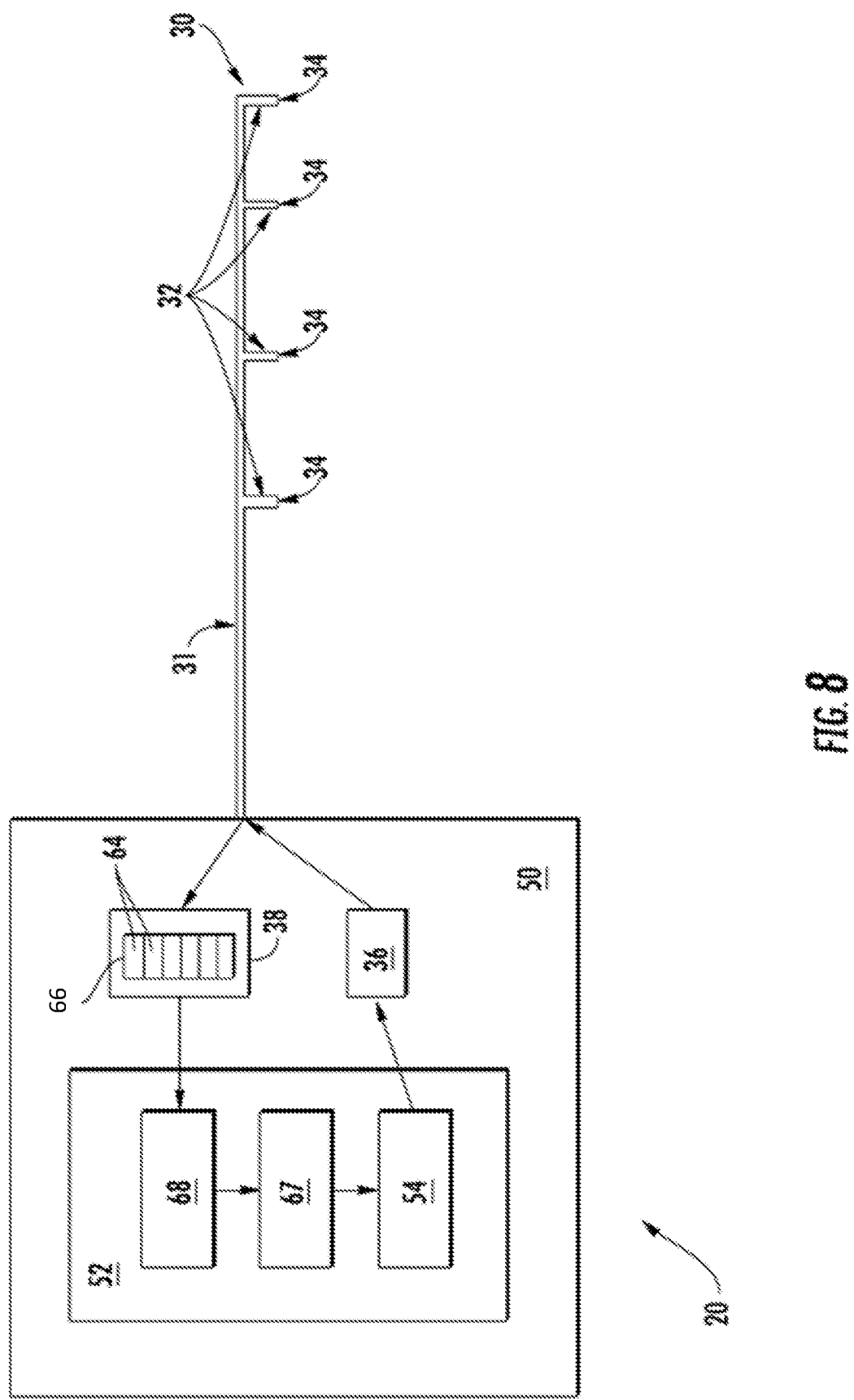
FIG. 8 is another schematic diagram of a detection system including an avalanche photo diode sensor according to an embodiment.

With reference now to FIG. 8, in an embodiment of the system 20, the light sensitive device 38 may include one or more Avalanche Photodiode (APD) sensors 64. For example, an array 66 of APD sensors 64 may be associated with the one or more fiber harnesses 30. In an embodiment, the number of APD sensors 64 within the sensor array 66 is equal to or greater than the total number of fiber harnesses 30 operably coupled thereto. However, embodiments where the total number of APD sensors 64 within the sensor array 66 is less than the total number of fiber harnesses 30 are also contemplated herein.

Data representative of the output from each APD sensor 64 in the APD array 66 is periodically taken by a switch 68, or alternatively, is collected simultaneously. The data acquisition 67 collects the electronic signals from the APD and associates the collected signals with metadata. The metadata as an example can be time, frequency, location or node. In an example, the electronic signals from the APD sensor 64 are synchronized to the laser modulation such that the electrical signals are collected for a period of time that starts when the laser is pulsed to several microseconds after the laser pulse. The data will be collected and processed by the processor 54 to determine whether any of the nodes 34 indicates the existence of a predefined condition or event. In an embodiment, only a portion of the data outputted by the sensor array 66 is collected, for example the data from a first APD sensor 64 associated with a first fiber harness 30. The switch 68 may therefore be configured to collect information from the various APD sensors 64 of the sensor array 66 sequentially. While the data collected from a first APD sensor 64 is being processed to determine if an event or condition has occurred, the data from a second APD 66 of the sensor array 66 is collected and provided to the processor 54 for analysis. When a predefined condition or event has been detected from the data collected from one of the APD sensors 64, the switch 68 may be configured to provide additional information from the same APD sensor 64 to the processor 54 to track the condition or event.

In an embodiment, a single control unit 52 can be configured with up to 16 APDs and the corresponding light sensitive devices 38 necessary to support up to 16 fiber harnesses 30, each fiber harness 30 having up to 30 nodes, resulting in a system with up to 480 nodes that can cover an area being monitored of up to 5000 square meters $m^2$. However, it should be understood that the system can be reconfigured to support more or fewer nodes to cover large buildings with up to a million $m^2$ or small enclosures with 5 $m^2$. The larger coverage area enables reducing or removing fire panels, high sensitivity smoke detectors and/or control panels.

Figure 9:
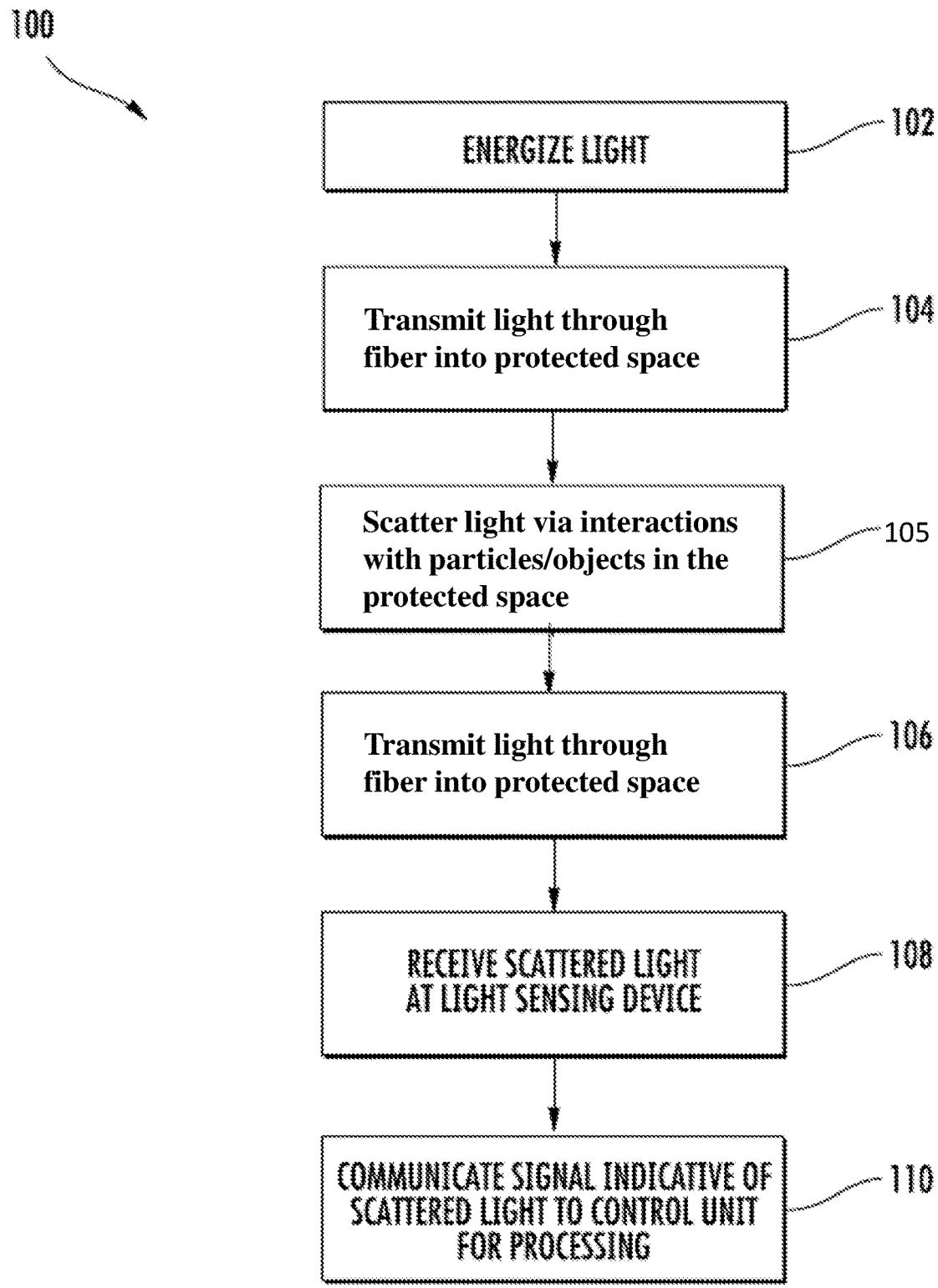
FIG. 9 is a method of operating a detection system according to an embodiment.

A method of operation 100 of the detection system 20 is illustrated in FIG. 9. The control unit 52 operably coupled to the light source 36 is configured to selectively energize the light source 36, as shown in block 102, and to emit light to a fiber harness 30 coupled thereto as shown in block 104. Based on the desired operation of the detection system 20, the control unit 52 may vary the intensity, duration, repetition, frequency, or other properties, of the light emitted. The light is transmitted through the fiber optic cable 28 and emitted at the node/nodes 34 into the protected space or area being monitored. At block 105, the light emitted into the area being monitored scatters as it interacts with particles or solid objects located within the space. In block 106, the scattered light is transmitted back through the fiber optic cable 28 via the second fiber cores 42. The scattered light may include one or more of scattered light that reflects from an interior of the fiber optic branch 32, and scattered light within the atmosphere adjacent the node 34 which is received by the node 34 and then, as already described, transmitted back through the fiber optic branches 32 via the second fiber cores 42. The scattered light is transmitted to the at least one light sensing device 38 in block 108. As shown in block 110, the light sensing device 38 generates a signal in response to the scattered light received by each node 34, and provides that signal to the control unit 52 for further processing.

Figure 10:
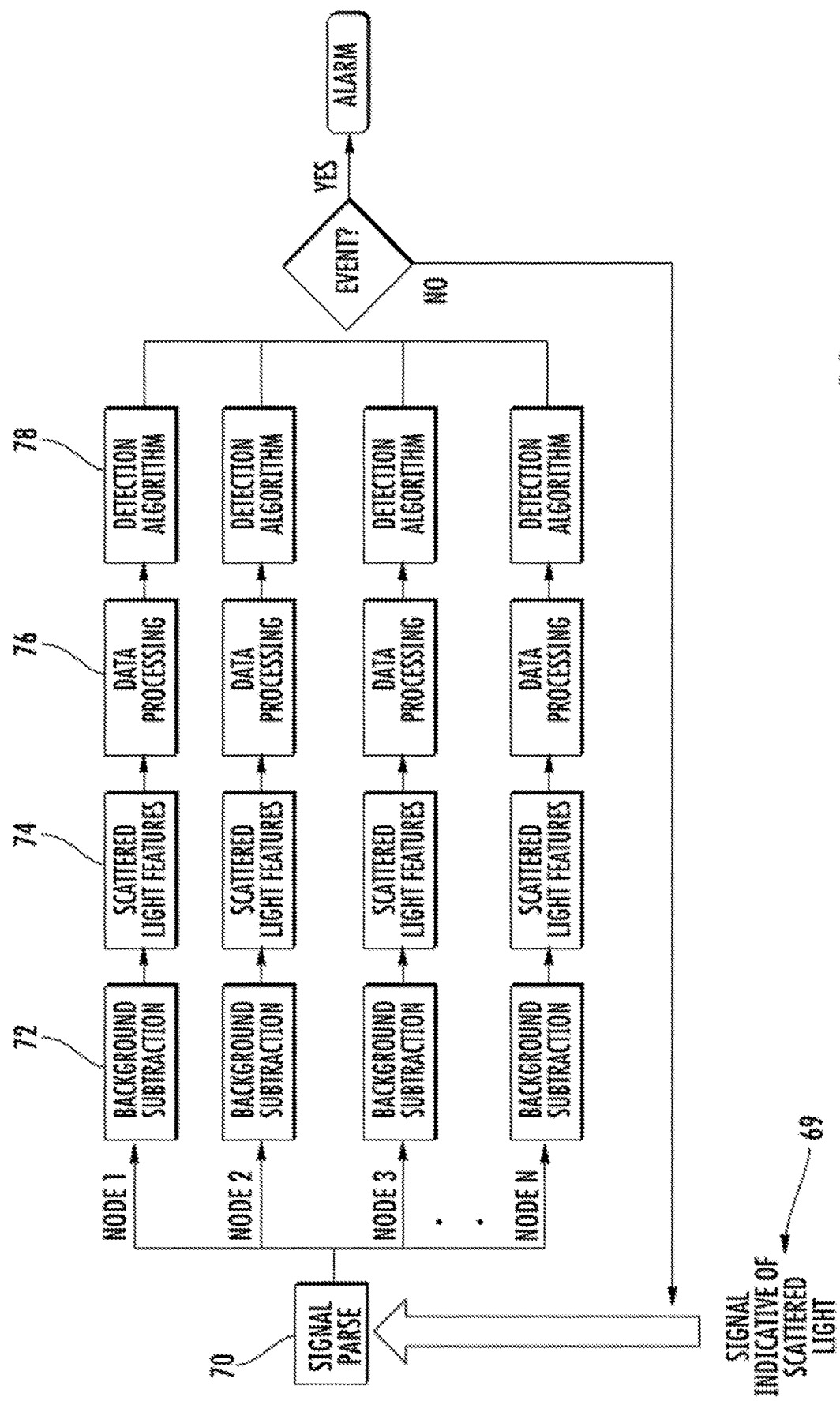
FIG. 10 is a schematic diagram of process flow for evaluating the signals generated by the light sensitive device according to an embodiment.

Using one or more algorithms 58 executed by the processor 54, each signal representing the scattered light received by each of the corresponding nodes 34 is evaluated to determine whether the light at the node 34 is indicative of a predefined condition, such as smoke for example. With reference to FIG. 10, a schematic diagram illustrating an example of a flow path for processing the signals generated by each of the nodes 34 is illustrated. As shown, the signal indicative of scattered light 69 is parsed, shown at block 70, into a plurality of signals based on their respective originating node 34. In the illustrated, non-limiting embodiment, background signals, illustrated schematically at 72, are subtracted from the data before the pulse features are evaluated for each of the individual signals. Through integration, pulse compression, and/or feature extraction, shown at block 74, one or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined by deep learning, dictionary learning, and/or adaptive learning and the like.

In an embodiment, the time of flight record is parsed and features are extracted. The time of flight record can cover a period of time. For example, a time of flight record can record light intensity over 0.001-1,000,000 nanoseconds, 0.1-100,000 nanoscceonds, or 0.1-10,000 microseconds. The features extracted from the signal can include, but are not limited to height, full width at half maximum, signal pick up time, signal drop off time, group velocity, integration, rate of change, mean, and variance for example.

Through application of the data processing, illustrated schematically at block 76, the features may then be further processed by using, for example, smoothing, Fourier transforms, or cross correlation. In an embodiment, the processed data is then sent to the detection algorithm at block 78 to determine whether or not the signal indicates the presence and/or magnitude of a condition or event at a corresponding node 34. This evaluation may be a simple binary comparison that does not identify the magnitude of deviation between the characteristic and a threshold. The evaluation may also be a comparison of a numerical function of the characteristic or characteristics to a threshold. The threshold may be determined a priori or may be determined from the signal. The determination of the threshold from the signal may include information from background learning. Background learning may be accomplished by adaptive filtering, model-based parameter estimation, statistical modeling, and the like. In some embodiments, if one of the identified features does not exceed a threshold, the remainder of the detection algorithm is not applied in order to reduce the total amount processing done during the detection algorithm. In the event that the detection algorithm indicated the presence of the condition at one or more nodes 34, an alarm or other fire suppression system may, but need not, be activated. It should be understood that the process for evaluating the data illustrated and described herein is intended as an example only and that other processes including some or all of the steps indicated in FIG. 10 are also contemplated herein.

The process for evaluating the data set forth in steps 70-78 of FIG. 10 may also advantageously employ classifiers including those that may be learned from the signal via deep learning techniques including, but not limited to deep neural networks, convolutional neural networks, recursive neural networks, dictionary learning, bag of visual/depth word techniques, Support Vector Machine (SVM), Decision Trees, Decision Forests, Fuzzy Logic, and the like. The classifiers may also be constructed using Markov Model techniques, Hidden Markov Models (HMM), Markov Decision Processes (MDP), Partially Observable MDPs, Markov Decision Logic, Probabilistic Programming, and the like.

In addition to evaluating the signals generated from each node 34 individually, the processor 54 may additionally be configured to evaluate the plurality of signals or characteristics thereof collectively, such as through a data fusion operation to produce fused signals or fused characteristics. The data fusion operation may provide information related to time and spatial evolution of an event or predetermined condition. As a result, a data fusion operation may be useful in detecting a lower level event, insufficient to initiate an alarm at any of the nodes 34 individually. For example, in the event of a slow burning fire, the light signal generated by a small amount of smoke near each of the nodes 34 individually may not be sufficient to initiate an alarm. However, when the signals from the plurality of nodes 34 are reviewed in aggregate, the increase in light returned to the light sensitive device 38 from multiple nodes 34 may indicate the occurrence of an event or the presence of an object not otherwise detected. In an embodiment, the fusion is performed by Bayesian Estimation. Alternatively, linear or non-linear joint estimation techniques may be employed such as maximum likelihood (ML), maximum a priori (MAP), non-linear least squares (NNLS), clustering techniques, support vector machines, decision trees and forests, and the like.

As illustrated and described above, the processor 54 is configured to analyze the signals generated by at least one light sensing device 38 relative to time. In another embodiment, the detection algorithm may be configured to apply one or more of a Fourier transform, Wavelet transform, space-time transform, Choi-Williams distribution, Wigner-Ville distribution and the like, to the signals to convert the signals from a temporal domain to a frequency domain. This transformation may be applied to the signals when the nodes 34 are being analyzed individually, when the nodes 34 are being analyzed collectively during a data fusion, or both.

The relationship between the light scattering and the magnitude or presence of a condition is inferred by measuring a signal's causality and dependency. As an example, the measure of a causality utilizes one or more signal features as an input and determines one or more outputs from a calculation of a hypothesis testing method, foreground ratio, second derivative, mean, or Granger Causality Test. Similarly, one or more signal features may be used as an input to evaluate the dependency of a signal. One or more outputs are selected from a calculation of a correlation, fast Fourier transform coefficients, a second derivative, or a window. The magnitude and presence of the condition is then based on the causality and dependency. The magnitude and presence of a condition may be calculated utilizing one or more evaluation approaches: a threshold, velocity, rate of change or a classifier. The detection algorithm may include utilizing the output from the calculation causality, dependency or both. This is used to indicate the presence of the condition at one or more nodes 34 and initiate a response.

When smoke is present within the ambient environment adjacent a node 34, the frequency effects of the light vary within a small range, such as from about 0.01 Hz to about 10 Hz for example. As a result, the evaluation of the frequency of the signals of scattered light may effectively and accurately determine the presence of smoke within the predetermined space 82. The detection algorithm may be configured to evaluate the signals in a fixed time window to determine the magnitude of the frequency or the strength of the motion of the smoke. Accordingly, if the magnitude of a frequency component exceeds a predetermined threshold, the algorithm 58 may initiate an alarm indicating the presence of a fire. In an embodiment, the predetermined threshold is about 10 Hz such that when the magnitude of the optical smoke frequency exceeds the threshold, a determination is made that smoke is present.

Figure 11A:
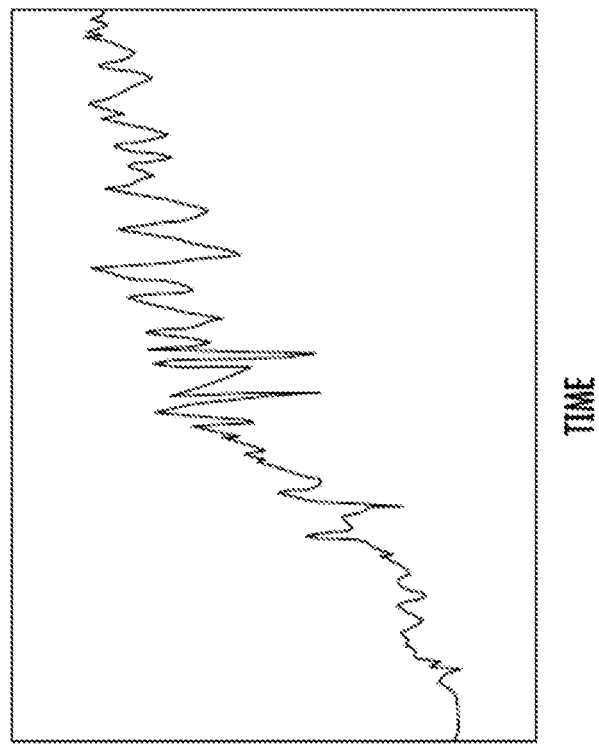
FIGS. 11a and 11b are diagrams illustrating the signals recorded by the detection system over time for various predefined conditions or events according to an embodiment.
Figure 11B:
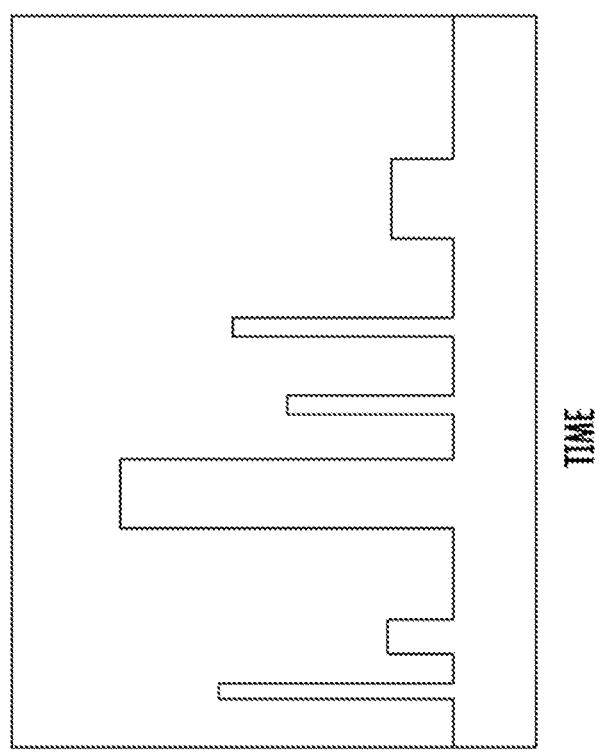

In an embodiment, the algorithm 58 is configured to distinguish between different events or conditions based on the rate of change in the light scattered by the atmosphere near the node 34 and received by one or more of the nodes 34 over time. With reference to FIGS. 11A and 11B, graphs of the signals recorded from a node 34 over time with respect to different events are illustrated. FIG. 11A indicates the change in the light signal received by a node 34 as a person walks through the area being monitored by the node 34. As shown in the graph, the movement of one or more persons through the area appears as one or more blocks or steps, each of which has an increased and constant magnitude relative to a baseline measurement. These steps indicate the temporary presence of a person and his or her proximity to the node 34. FIG. 11B, which represents the detection of smoke from a smoldering fire, appears graphically as a continuously changing signal having an accelerating increase in the change in light signal received by a node 34 over time. It should be understood that the graphs illustrated are examples only. Accordingly, each predefined event detectable by the detection system 20 has one or more unique parameters associated therewith such that the control unit 52 of the detection system 20 can distinguish between and identify multiple types of events.

To reduce the noise associated with each signal, the light emitting device 36 may be modulated such that the device 36 is selectively operated to generate modulated light in a specific pattern. In an embodiment, the light within the pattern may vary in intensity, duration, frequency, phase, and may comprise discrete pulses or may be continuous. The specific pattern of light may be designed to have desirable properties such as a specific autocorrelation with itself or cross-correlation with a second specific pattern. When the light is emitted in a specific pattern, the light scattered back to a corresponding light sensing device 38 should arrive in the substantially same pattern. Use of one or more specific and known patterns provides enhanced processing capabilities by allowing for the system 20 to reduce overall noise. This reduction in noise when combined with the signal processing may result a reduction of false positives and improved device sensitivity, e.g. with an improved signal to noise ratio the total number of false events or conditions detected will decrease, and the device sensitivity may be improved. Improvement of device sensitivity may further increase the functional limits of the detection system 20. By cross-correlating one or more second patterns, specific causes of transmitted or reflected signals may be distinguished, e.g. by Bayesian estimation of the respective cross-correlations of the received signal with the one or more second patterns.

In addition, modulation of the light signal emitted by the light source 36 may provide improved detection by determining more information about the event or condition causing the scatter in the light signal received by the node 34. For example, such modulation may allow the system 20 to more easily distinguish between a person walking through the designated area adjacent a node, as shown in FIG. 11A, and a smoldering fire adjacent the node 34.

Figure 12A:
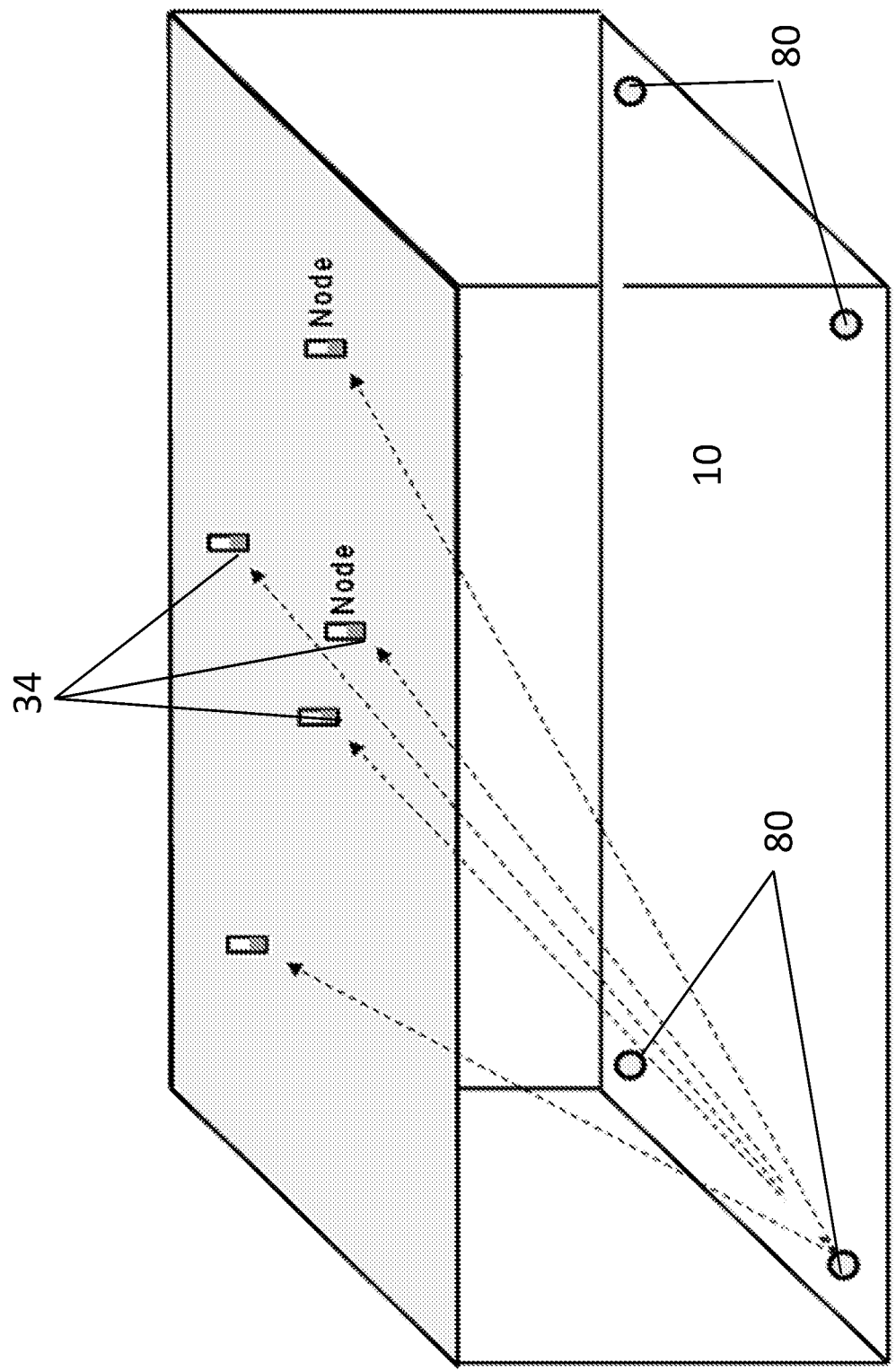
FIGS. 12A-12C are various perspective views of a detection system within an area and at least one emitter for mapping a physical location of the nodes of the detection system according to an embodiment.
Figure 12B:
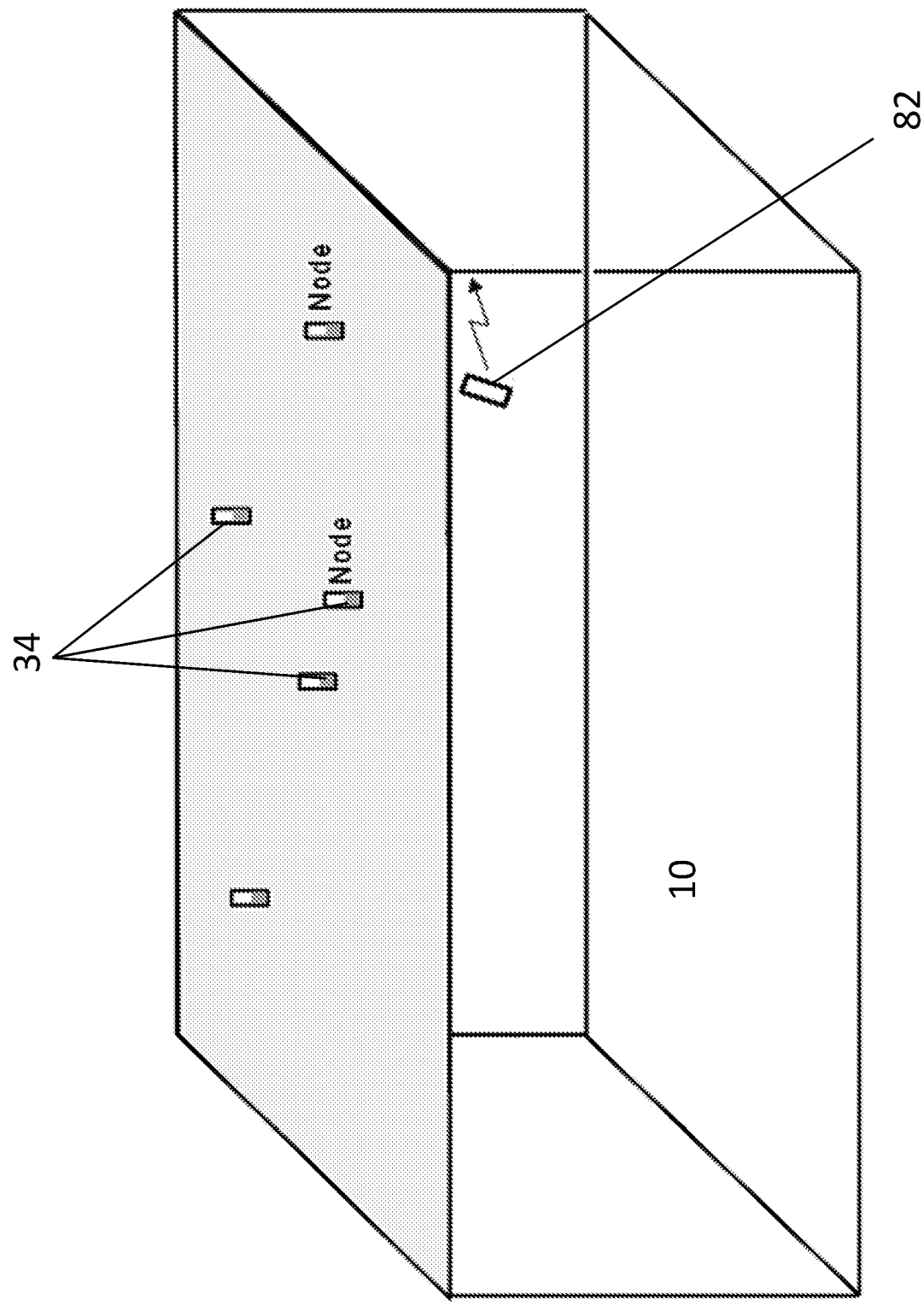
Figure 12C:
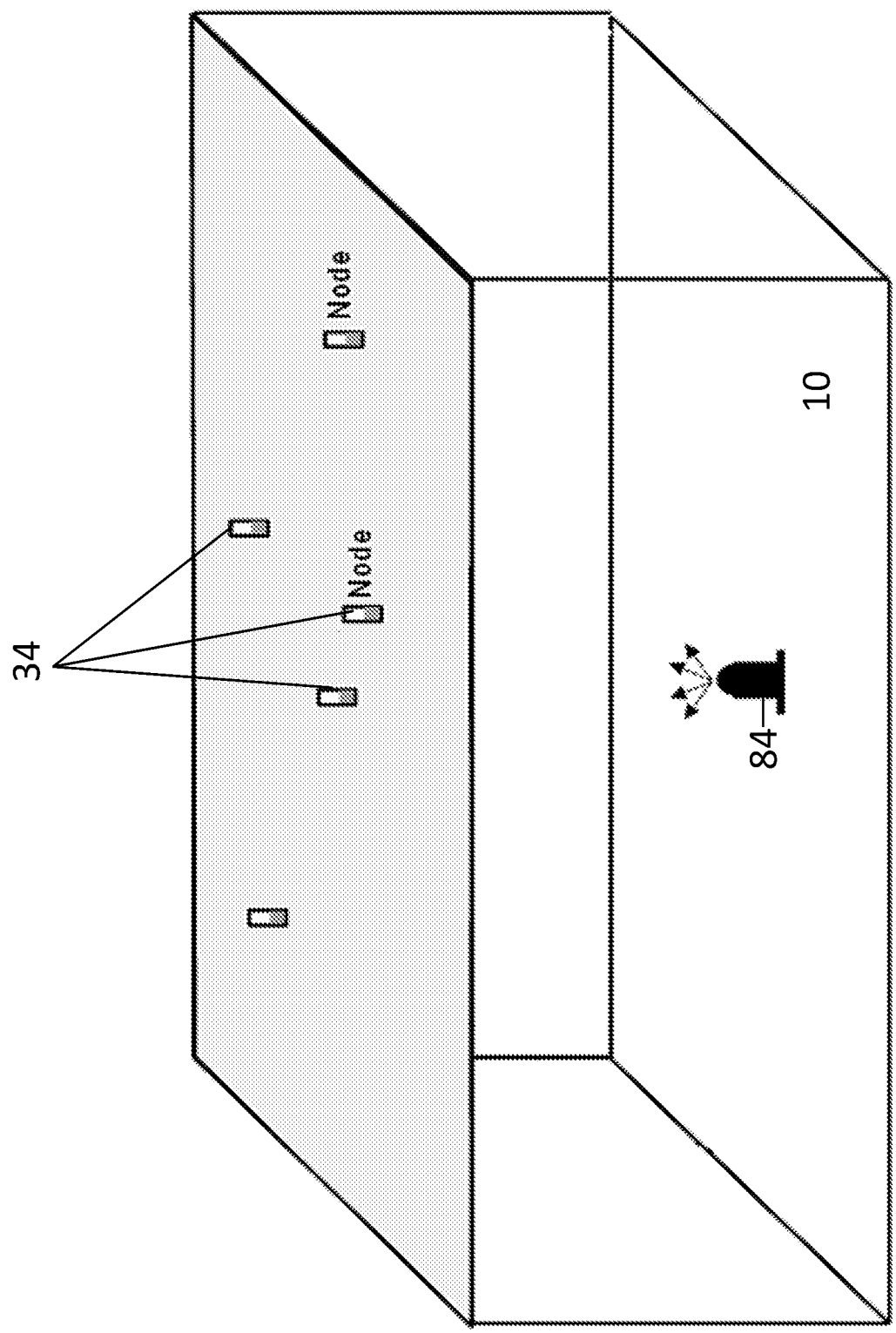

With reference now to FIGS. 12A-12C, in an embodiment, the detection system 20 allows for automatic generation of a map (not shown), also referred to herein as "mapping," which includes identifying a physical location of each of the plurality of nodes 34 of the system 20 within a structure, building, or other predetermined area 10. This mapping is particularly beneficial because the physical distance between nodes 34 may, but need not, be equal to the length of a fiber cable 28 between nodes. Further, such mapping of the plurality of nodes 34 may be performed optically, such as by tracking the time at which a light emitted from one or more known locations is received at a node 34. In an embodiment, illustrated in FIG. 12A, a plurality of emitters 80 are distributed throughout the area 10 within which the nodes 34 of the detection system 20 are installed. The location of each of the plurality of emitters 80 is known.

To determine a location of each node 34, the time elapsed between when a light is emitted by an emitter 80 and when that light is received at a corresponding node 34, commonly referred to as the time of flight, is measured. The time of flight measured between a node 34 and an emitter 80 may be used to determine a position of the node 34 relative to that emitter 80. By combining this distance information from several emitters 80 located at various positions throughout the area 10 using known triangulation methods, the physical position of a node 34 may be identified as the position where the graphical representation of the measured distance from each of the plurality of emitters 80 intersects. In some embodiments, the length of the fiber optic cable 28 extending between a node 34 and the control unit 52 is known. Such information may be used in conjunction with the time of flight information to get three measurements and solve for the location of the node 34. However, if the length of the fiber optic cable 28 between the node 34 and the control unit 52 is unknown, the position of the node 34 may be determined using the information from four emitters 80 (three differential measurements). A length of the fiber optic cable 28 may also be determined.

In the case where multiple nodes 34 are connected to one light sensitive device 38, and the nodes 34 are separated along fiber cable 28 by more than the maximum time of flight, then the received light from emitters 80 may be unambiguously assigned to each node 34 based on time of arrival. Alternatively, if the nodes 34 are spaced along fiber cable 28 by less than the maximum time of flight, then with additional emitters 80, a joint estimation may be performed to simultaneously determine the locations of nodes 34. In the most general case, where there are N nodes at N different positions along the fiber 28, there are 4×N parameters to calculate (3 dimensions and the length of fiber for each node). This can be accomplished by moving an emitter around the room while recording its position with each flash. After 4N or more flashes, there will be enough measurements to solve for the unknown parameters and locate all the nodes. Improved accuracy is possible by gathering additional measurements and computing a least squares solution. The emitters 80 may be deployed temporarily or permanently.

In another embodiment, best shown in FIG. 12B, a self-localizing emitter 82 may be used to identify a location of each of the plurality of nodes 34 via differential global positioning, WiFi localization, RFID based localization, Beacon based localization, and the like. In an embodiment, the self-localizing emitter is a handheld device that is movable throughout the area 10 to a position associated with each of the plurality of nodes 34. In another embodiment, the mapping can be accomplished by physically blocking each node individually while the detector is emitting light and placing a GPS locator in communication with the control unit next to the node 34. This can also be the functional test of the system. Alternatively, or in addition, one or more scanning directional emitters 84, as shown in FIG. 12C, may be positioned within the area 10, in communication with the plurality of nodes 34. The position of the scanning emitter 84 is known, and the scanning emitter 84 can track its orientation within the area 10. Using the fixed position of the emitter 84 and the angle of the emitter 84 when various light signals are emitted, a position of a corresponding node 34 where the various light signals are received can be determined. The methods of mapping the position of the nodes 34 of the system illustrated and described herein are intended as an example only and it should be understood that other methods for mapping the position of the nodes 34, such as manual annotation for example, are also within the scope of the disclosure.

Regardless of the method used to determine the location of each of the plurality of nodes 34, a computer model, such as a CAD model, BIM model, and the like, of the area 10 being monitored by the detection system 20 may be created or updated to include each of the plurality of nodes 34 and their respective locations within the building or area being monitored. Each of the methods for determining a position of each of the plurality of nodes 34 described herein requires communication between the emitters 80, 82, 84 and the nodes 34 to correlate emission of a light from an emitter 80, 82, 84 and the detection of the emitted light by a corresponding node 34. Each of the methods for determining a position of each of the plurality of nodes 34 described herein can also determine the number of nodes, which requires communication between the emitters 80, 82, 84 and the nodes 34 to correlate emission of a light from an emitter 80, 82, 84 and the detection of the emitted light by a corresponding node 34. In an embodiment, this communication may be accomplished wirelessly. Alternatively, the communication may be accomplished over a wired communication link. The communication between the emitters 80, 82, 84 and the control system 50 is used to identify a two-dimensional or three-dimensional spatial position of each node 34 as well as a time of flight. The time of flight is used to localize signals received at the control system by specifically identifying a node where a signal originated, a fiber harness on which the node 34 is positioned, and the actual position of the fiber harness and the node 34 within a building or area 10.

Once the position of the node 34 within the area 10 is known, one or more setting or parameters associated with the detection system 20 may be adjusted to enhance operation of the system 20. For example, smoke propagation may be tracked and used to revise the detection algorithms. In addition, based on the location of each node 34, a sensitivity of the nodes 34 may be adjusted to reduce the likelihood of the occurrence of false alarms. In an embodiment, the control system 50 is used to install the plurality of nodes 34, to determine a physical location, also referred to as "commissioning," of the plurality of nodes 34 relative to the area 10, to evaluate the presence of one or more conditions during operation of the system 20, and to indicate when maintenance is needed and at what specific node or location.

Figure 13:
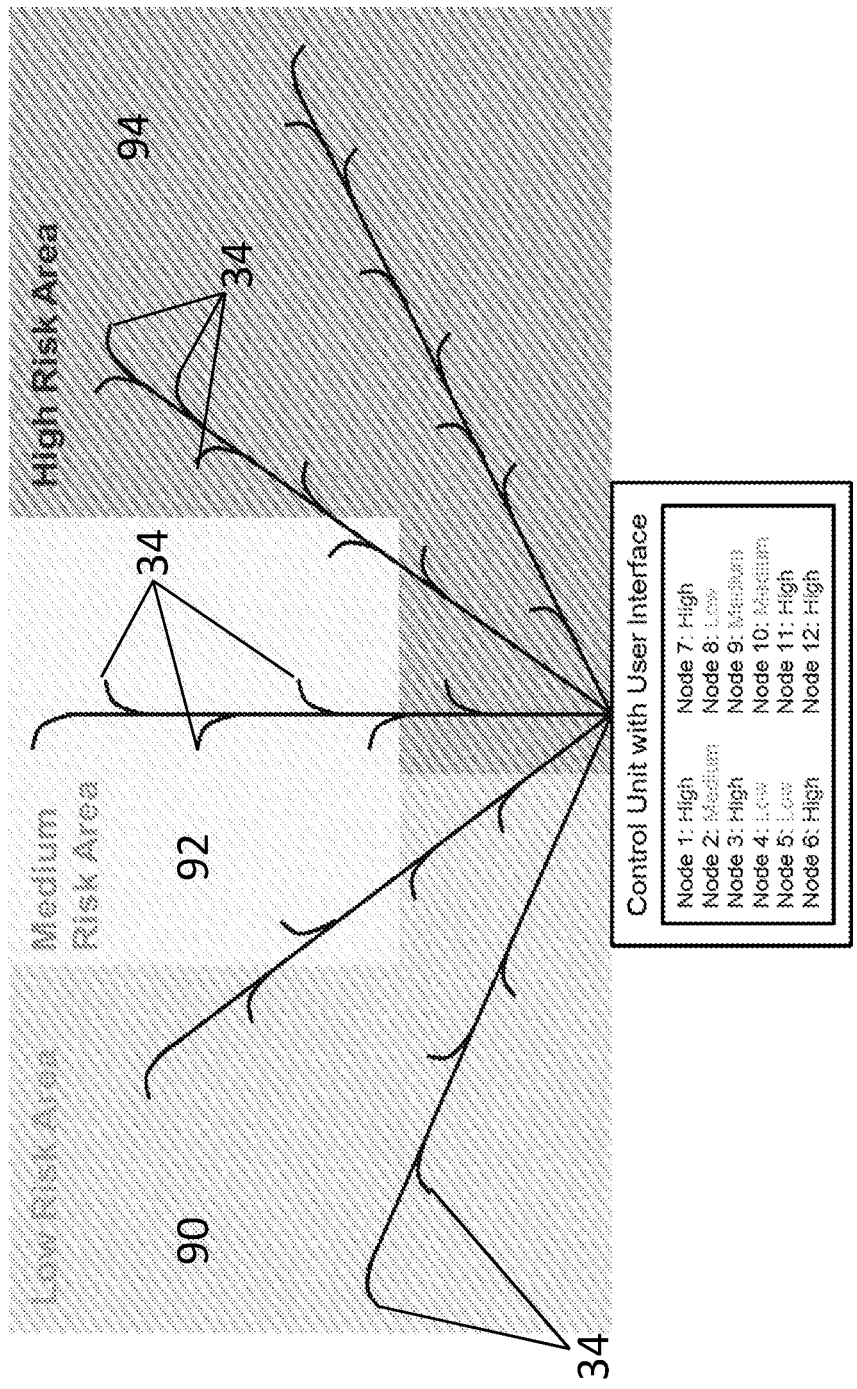
FIG. 13 is a graphical representation of one or more risk regions within a predetermined area having a detection system according to an embodiment.

With reference now to FIG. 13, as shown, the area 10 being monitored may be broken down into regions based on one or more parameters associated with each of the regions. Examples of suitable parameters include, but are not limited to, risk of occurrence of a condition, traffic flow within the region, assets within the region, environmental nuisances, access to the environment within the region, and severity of a false alarm, for example. In the illustrated, non-limiting embodiment, the area 10 shown in FIG. 13 includes a low risk region 90, a medium risk region 92, and a higher risk region 94. The low risk region 90 may be a region that has no valuable assets or is inherently immune to damage and the higher risk regions 92, 94 may be regions where an event is more likely to occur, or where the highest value assets are located.

By determining the physical location of each node 34 of the system 20 relative to the area 10 being monitored, a corresponding region of the area 10 associated with each of the nodes 34 may be identified. Based on the region within which each node 34 is located, it may be desirable to adjust the sensitivity of the nodes 34 individually. For example, each of the plurality of nodes 34 of the system of FIG. 13 is located within one of a low risk region 90, a medium risk region 92, and a high risk region 94. The sensitivity of the nodes 34 within the low risk region 90 may be selectively or continuously reduced compared to the sensitivity of the nodes 34 within the medium and high risk regions 92, 94 and the sensitivity of the nodes 34 within the medium risk region 92 may be selectively or continuously reduced compared to the sensitivity of the nodes 34 within the high risk region 94. In an embodiment, the sensitivity of each of the nodes 34 is controllable independently by adjusting one or more parameters associated with the algorithm run by the control unit 50 and configured to process the data collected at each node 34. Further, the sensitivity of a node 34 may be adjusted at any time and for any reason. For example, the sensitivity of one or more of the nodes 34 may be controlled based on a time of day, a day of the week, and/or in response to a condition detected at another node within the system.

In an embodiment, the sensitivity of the nodes 34 may be selected depending on the status of the area being monitored. For example, the sensitivity of a node 34 installed in a cargo bay of an aircraft can be reduced, or the algorithm may be modified, when the aircraft is on the ground and the cargo bay doors are open. Such adjustments may be performed to reduce the likelihood of nuisance alarms caused by movement of cargo, dust storms, fog, or insecticides. Alternatively, or in addition, the system 20 can modify how a user is notified when an alarm occurs. For example, if the cargo bay doors are open and alarm occurs, an audible sound and flashing light may alert the ground crew of the aircraft, rather than (or in addition to) sending a signal to the cockpit which might be unattended. Similarly, the sensitivity of one or more nodes 34 can be adjusted depending on the type of cargo in the cargo bay.

Figure 14:
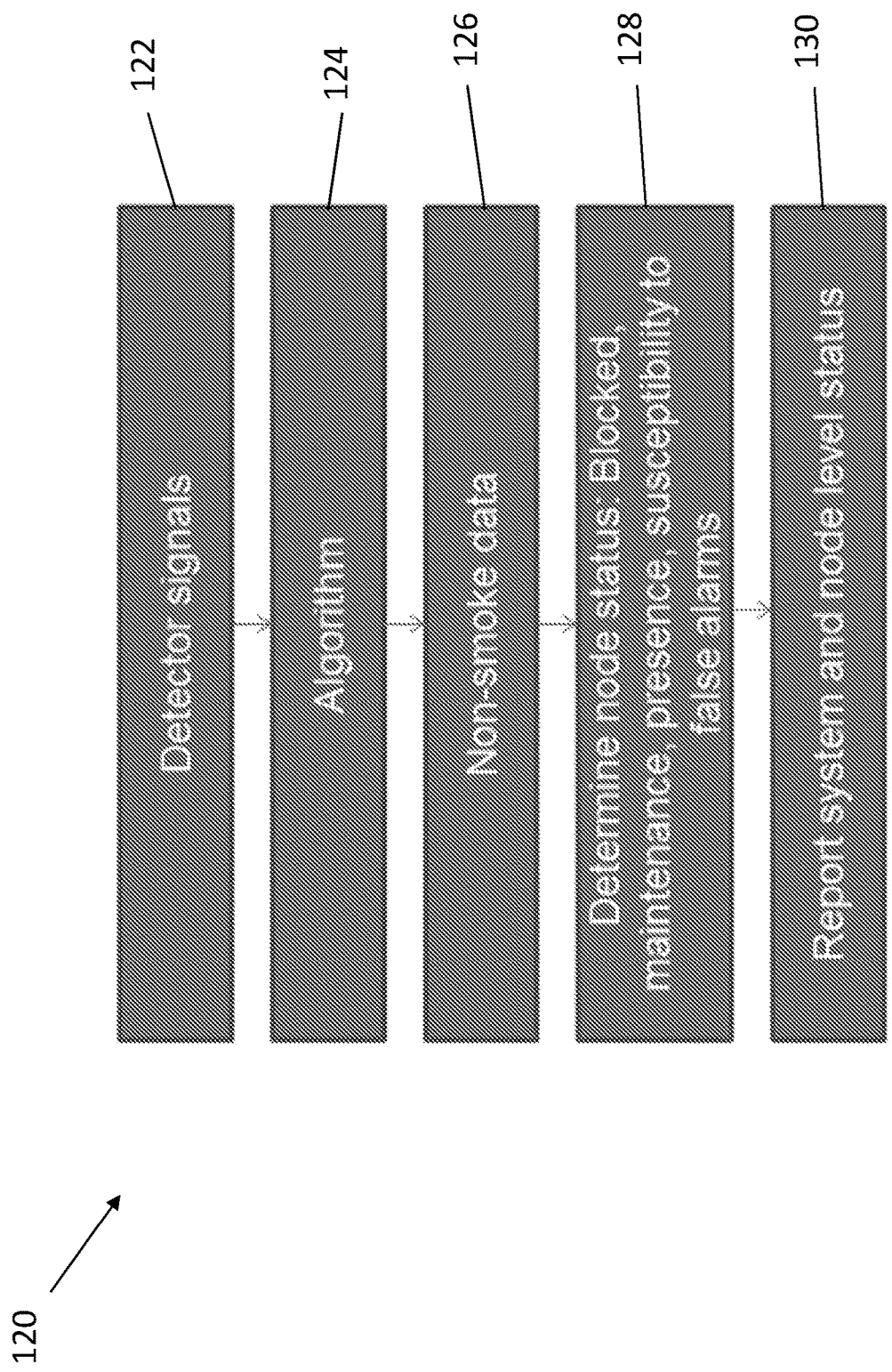
FIG. 14 is a flow chart illustrating a process for detecting an operational condition of a node according to an embodiment.

In another embodiment, the operational parameters or sensitivity of each node 34 may be adjusted individually in response to a detected condition of the node 34. With reference now to FIG. 14, during normal operation of the system 20, a status or condition of each of the plurality of nodes 34 of the system 20 may be monitored individually, via method 120, using the data accumulated from each node 34 when a condition has not been identified. This background data may be referred to herein as non-smoke data. This data includes information about the performance of each node 34, the presence of people or objects adjacent each node, and the building environment at each node. The background data is identified after the information received from the node 34 is provided to the control unit 50 for evaluation of the presence of a predefined condition, as shown in block 122. Upon determining that the condition is not present, at block 124, the data is labeled as "non-smoke data" (see block 126) and is provided to a secondary algorithm, shown in block 128. The secondary algorithm, separate from the algorithm configured to identify the presence of one or more conditions at the node, is used to analyze this background or non-smoke data to identify changes in the operation of each node 34. A status generated by the secondary algorithm may be communicated to a central unit, display, or other input/output device, shown in block 130. Additionally, the background data may be used to create a dynamic background model as a function of time at one or more time scales, e.g., over days, weeks, months, or years, for use in background subtraction 72.

The operational status evaluated using the secondary algorithm may be used to determine a condition of the node 34 and whether or not maintenance of the node 34 is required. In an embodiment, the secondary algorithm may identify that the node 34 has reduced sensitivity to be able to detect the event condition, for example resulting from a portion of the node 34 being physically blocked or being dirty. Upon determination of such a condition, the system 20 may be configured to recommend manual correction, i.e. identify that maintenance of the node 34 is required. Alternatively, or in addition, the system 20 may automatically adjust the operational settings associated with the node 34 to compensate for the detected condition. For example, when the secondary algorithm has determined that the node 34 is dirty or partially blocked, the system 20 may automatically increase the sensitivity of the node 34 to compensate for the reduced detectability at the node 34.

In another embodiment, the secondary algorithm may be used to determine each node's susceptibility to a false alarm. Similarly, in embodiments where a node 34 is determined to have a high susceptibility to false alarms, the system 20 may automatically adjust the sensitivity of that node 34 to decrease the likelihood of the occurrence of such false alarms. The modification of the operation of the nodes 34 in response to the condition determined using the secondary algorithm and the background data of each node 34 may be based on an analysis that occurs over a single time scale, or several time scales. These time scales may have a magnitude of minutes, hours, days, weeks, months, or years. Further, any adjustment made to the operation of the node 34 may be reported to a central unit, a display, or another input/output device for user monitoring and/or verification.

Figure 15:
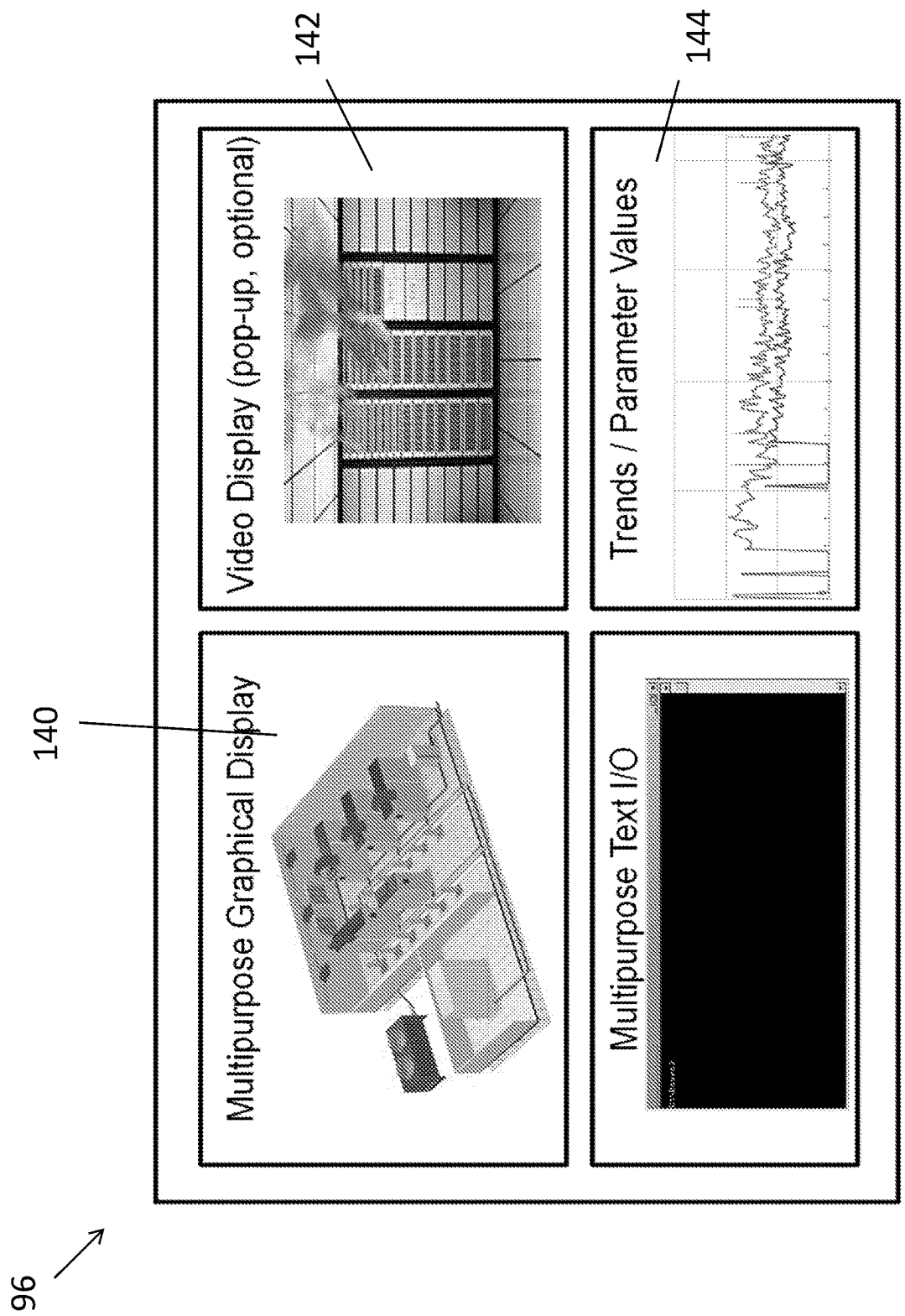
FIG. 15 is a graphical representation of an interactive display associated with the detection system according to an embodiment.

Referring now to FIG. 15, an example of an interface or interactive display 96 compatible with the detection system 20 is illustrated. The interface 96 is configured to receive and display information associated with one or more inputs. The inputs may be operable by a user, or alternatively, may be devices within the facility or building being monitored. Examples of suitable devices include but are not limited to components of the fire detection system 20, badge readers, proximity detectors, cameras, and other sensors arranged throughout the facility. In an embodiment, the user inputs enable entry of contact information, such as a mobile number or an email address for example, for receiving communications for the interface 96. Further, in an embodiment, the user input may allow a user to access the interface 96 for performance of one or more functions, including when the user is located remotely from the facility. This access may allow the user to adjust one or more parameters of the algorithm being run by the control unit. In another embodiment, the user inputs provide one or more levels of authorization. Authorization may be provided such as via a password, token, or biometric, and the functions of the interactive display may be enabled and disabled based on the level or authorization provided with each user.

As shown, the interface 96 may be capable of providing one or more of the following features: a geometrically accurate map of the facility of building being monitored by the system 20, shown at 140, or a map optionally annotated with locations of each of the components including detector locations or nodes of the system 20. In an embodiment, the annotatable map is operable to further indicate at least one of a location, size, growth rate, and projected propagation of a fire, item 142. Upon detection of an event, such as a fire for example, within the facility, the interface may be configured to automatically select and display a map and other relevant information associated with the location of the detected event. Furthermore, if an event is detected, the interface may provide the user with the ability to set off all or part of a fire suppression system in any location of the facility.

Further, the interface 96 may be operable by a user to display one or more detection algorithm parameters, shown at 144, and/or a time history associated with such parameters, such as discrete changes and automatic changes based on the time of day, day or the week, and the like. Alternatively, or in addition, a user may operate the interface to display detections over time including actual fires, missed detections, and false alarms.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of detecting the occurrence of a condition using a detection system located within a predetermined area comprising:
    transmitting light from at least one node of a plurality of nodes into an ambient atmosphere adjacent the at least one node;
    receiving scattered light from the ambient atmosphere at the at least one node;
    communicating the received scattered light to a control system operably coupled to the at least one node;
    analyzing the scattered light at the control system to determine a condition of the ambient atmosphere adjacent each at least one node; and
    adjusting a sensitivity of the at least one node of the plurality of nodes, wherein adjusting the sensitivity of the at least one node further comprises determining a region of the predetermined area within which the at least one node is located and determining a risk associated with the region of the at least one node.

2. The method of claim 1, wherein the risk associated with the region of the at least one node is determined based upon at least one of a risk of occurrence of a condition, traffic flow within the region, assets located within the region, environmental nuisances, and access to an environment within the region.

3. The method of claim 1, wherein adjusting the sensitivity of the at least one node comprises altering one or more parameters associated with analyzing the scattered light.

4. The method of claim 3, wherein the one or more parameters comprises one or more of a time of day, a day of week, a day of month, and a day or year.

5. The method of claim 3, wherein the one or more parameters comprises a condition detected at another node of the plurality of nodes.

6. The method of claim 2, wherein adjusting the sensitivity of the at least one node further comprises determining an operational status of the at least one node using the control system.

7. The method of claim 6, wherein determining an operational status of the at least one node comprises analyzing background data collected by the control system.

8. The method of claim 6, wherein adjusting a sensitivity of the at least one node occurs in response to determining the operational status of each of the plurality of nodes.

9. A method of detecting the occurrence of a condition using a detection system located within a predetermined area comprising:
transmitting light from at least one node of a plurality of nodes into an ambient atmosphere adjacent the at least one node;
receiving scattered light from the ambient atmosphere at the at least one node;
communicating the scattered light to a control system operably coupled to the at least one node;
analyzing the scattered light using an algorithm to evaluate a condition of the ambient atmosphere adjacent the at least one node; and
displaying on a display a status of the predetermined area in response to information provided by at least one node of the control system and an input, wherein the input is provided separately from the information provided by the at least one node of the control system.

10. The method of claim 9, wherein displaying a status of the predetermined area comprises displaying a map of the predetermined area, a location of the at least one node, and a location where the condition was detected.

11. The method of claim 10, wherein displaying the location where the condition was detected comprises identifying a node where the condition was detected.

12. The method of claim 9, wherein the at least one input is received by a user interface.

13. The method of claim 12, wherein the at least one input comprises a command to adjust one or more parameters associated with the control system.

14. The method of claim 12, wherein the at least one input comprises authorization credentials.

15. The method of claim 12, wherein displaying a status of the predetermined area further comprises displaying information about a status of a node comprising a blocked node or non-functioning node.

16. The method of claim 12, further comprising displaying on the display one or more algorithm parameters associated with the control system.

* * * * *